(12) United States Patent
Lysejko et al.

(10) Patent No.: US 9,392,613 B2
(45) Date of Patent: Jul. 12, 2016

(54) SYSTEM AND METHOD FOR DETERMINING A COMMUNICATIONS SCHEDULE FOR RELAY NODES OF A WIRELESS RELAY NETWORK

(71) Applicant: Airspan Networks Inc., Boca Raton, FL (US)

(72) Inventors: Martin Lysejko, Bagshot (GB); Andrew Logothetis, Buckinghamshire (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 641 days.

(21) Appl. No.: 13/722,686

(22) Filed: Dec. 20, 2012

(65) Prior Publication Data
US 2013/0163505 A1     Jun. 27, 2013

(30) Foreign Application Priority Data

Dec. 23, 2011 (GB) .................................. 1122262.7
Oct. 8, 2012 (GB) .................................. 1217996.6

(51) Int. Cl.
*H04W 72/08*      (2009.01)
*H04W 72/12*      (2009.01)
(Continued)

(52) U.S. Cl.
CPC ............. *H04W 72/12* (2013.01); *H04B 7/2606* (2013.01); *H04W 40/22* (2013.01); *H04W 72/08* (2013.01)

(58) Field of Classification Search
None
See application file for complete search history.

(56) References Cited

U.S. PATENT DOCUMENTS

2003/0081626 A1* 5/2003 Naor ................... H04L 12/5601
                                                   370/431
2004/0252632 A1* 12/2004 Bourdoux et al. ............ 370/210
(Continued)

FOREIGN PATENT DOCUMENTS

GB          2452167 A     2/2009
WO     2008011717 A1    1/2008
(Continued)

OTHER PUBLICATIONS

Search Report of corresponding International Application No. PCT/GB2012/052686; Feb. 13, 2013; 11 pp.
(Continued)

*Primary Examiner* — Omar Ghowrwal
*Assistant Examiner* — Angel Brockman
(74) *Attorney, Agent, or Firm* — Haynes Beffel & Wolfeld LLP

(57) ABSTRACT

A communications schedule routes data between relay nodes forming a wireless relay network and interconnects relay nodes by an ordered sequence of communications links established over a wireless resource comprising resource blocks. Candidate connectivity patterns for the ordered sequence of communications links and candidate resource allocations are provided. For each candidate connectivity pattern, a level of a performance characteristic is calculated for a selected combination of the candidate resource allocations. Based on a desired level of the performance characteristic, a candidate connectivity pattern and associated selected combination of candidate resource allocations whose calculated level of the performance characteristic meets the desired level, is selected as the communications schedule. In response to a trigger condition, the performance level evaluation process and the selection process are repeated to re-select one of the candidate connectivity patterns and its associated selected combination of candidate resource allocations to be used as the communications schedule.

31 Claims, 22 Drawing Sheets

(51) Int. Cl.
*H04W 40/22* (2009.01)
*H04B 7/26* (2006.01)

(56) References Cited

U.S. PATENT DOCUMENTS

2007/0191066 A1* 8/2007 Khojastepour et al. .... 455/562.1
2011/0287798 A1* 11/2011 Ono et al. .................... 455/509
2012/0082104 A1* 4/2012 Lysejko et al. ............... 370/329

FOREIGN PATENT DOCUMENTS

| WO | 2008057595 | A2 | 5/2008 |
|----|------------|----|----|
| WO | 2008127631 | A1 | 10/2008 |
| WO | 2011008975 | A1 | 1/2011 |

OTHER PUBLICATIONS

Jan. 22, 2013 Search Report in related application GB 1217996.6, 1p.
Marques, A.G. et al., "Optimal Cross-Layer Design of Wireless Fading Multi-Hop Networks," in Cross Layer Designs in WLAN Systems, N. Zorba et al., eds., Troubador Pub., UK, 2011, 44 pp.
Georgiadis, L., et al., "Resource Allocation and Cross-Layer Control in Wireless Networks," Foundations and Trends in Networking, vol. 1(1), 2006, 146 pp.
Wu, B.Y. et al., "Spanning Trees and Optimization Problems," vol. 19 of Discrete Mathematics and Its Applications Series, CRC Press, 2004; Chapter 1—Counting Spanning Trees, pp. 1-7.

* cited by examiner

| ASN-GW | Access Services Network Gateway |
| BS | Base Station (WiMAX) |
| MS | Mobile Station (WiMAX) |
| eNodeB | Enhanced Node B (LTE BS) |
| UE | User Equipment (LTE MS) |
| FBS | Feeder Base Station |
| FTR | Feeder Terminal Relay |
| FNC | Feeder Network Controller |

| ASN-GW | Access Services Network Gateway |
| BS | Base Station (WiMAX) |
| MS | Mobile Station (WiMAX) |
| eNodeB | Enhanced Node B (LTE BS) |
| UE | User Equipment (LTE MS) |
| FBS | Feeder Base Station |
| FTR | Feeder Terminal Relay |
| FNC | Feeder Network Controller |

WiMAX / LTE air I/F
Air Synergy Feeder air I/F
Air Synergy Feeder Control

Connectivity patterns

DL connectivity graphs. Node 0 = source.

UL connectivity graphs. Node 0 = sink.

Creating FIG.5C from Prufer Sequence

N = NULL

Load matrix for example of FIG. 5A

Assume equal load for every node

|   | 0 | 1 | 2 | 3 | 4 | 5 |
|---|---|---|---|---|---|---|
| 0 | N | 5 | N | N | N | N |
| 1 | N | N | 4 | N | N | N |
| 2 | N | N | N | 3 | N | N |
| 3 | N | N | N | N | 2 | N |
| 4 | N | N | N | N | N | 1 |
| 5 | N | N | N | N | N | N |

FIG. 7A

Load matrix for example of FIG. 5B

|   | 0 | 1 | 2 | 3 | 4 | 5 |
|---|---|---|---|---|---|---|
| 0 | N | 5 | N | N | N | N |
| 1 | N | N | N | 4 | N | N |
| 2 | N | N | N | N | N | N |
| 3 | N | N | N | N | N | 3 |
| 4 | N | N | 1 | N | N | N |
| 5 | N | N | N | N | 2 | N |

FIG. 7B

Load matrix for example of FIG. 5C

|   | 0 | 1 | 2 | 3 | 4 | 5 |
|---|---|---|---|---|---|---|
| 0 | N | N | 5 | N | N | N |
| 1 | N | N | N | N | N | N |
| 2 | N | N | N | N | 4 | N |
| 3 | N | 1 | N | N | N | N |
| 4 | N | N | N | 2 | N | 1 |
| 5 | N | N | N | N | N | N |

FIG. 7C

Load matrix for example of FIG. 5D        N = NULL

|   | 0 | 1 | 2 | 3 | 4 | 5 |
|---|---|---|---|---|---|---|
| 0 | N | N | N | N | N | N |
| 1 | 5 | N | N | N | N | N |
| 2 | N | 4 | N | N | N | N |
| 3 | N | N | 3 | N | N | N |
| 4 | N | N | N | 2 | N | N |
| 5 | N | N | N | N | 1 | N |

Assume equal load for every node

FIG. 7D

Load matrix for example of FIG. 5E

|   | 0 | 1 | 2 | 3 | 4 | 5 |
|---|---|---|---|---|---|---|
| 0 | N | N | N | N | N | N |
| 1 | 5 | N | N | N | N | N |
| 2 | N | N | N | 1 | N | N |
| 3 | N | 4 | N | N | N | N |
| 4 | N | N | N | N | N | 2 |
| 5 | N | N | N | 3 | N | N |

FIG. 7E

Load matrix for example of FIG. 5F

|   | 0 | 1 | 2 | 3 | 4 | 5 |
|---|---|---|---|---|---|---|
| 0 | N | N | N | N | N | N |
| 1 | N | N | N | 1 | N | N |
| 2 | 5 | N | N | N | N | N |
| 3 | N | N | N | N | 2 | N |
| 4 | N | N | 4 | N | N | N |
| 5 | N | N | N | N | 1 | N |

FIG. 7F $$L = \begin{bmatrix} 0 & 0 & l^1+l^2+l^3+l^4+l^5 & 0 & 0 & 0 \\ 0 & 0 & 0 & 0 & 0 & 0 \\ 0 & 0 & 0 & 0 & l^1+l^3+l^4+l^5 & 0 \\ 0 & l^1 & 0 & 0 & 0 & 0 \\ 0 & 0 & 0 & l^1+l^3 & 0 & l^5 \\ 0 & 0 & 0 & 0 & 0 & 0 \end{bmatrix}$$

Load matrix (non-equal loads for example of FIG. 5C)
FIG. 7G

Time-frequency resource allocation for the optimum communication schedule for relay node separation = 10 km.

Ingress and egress rate per node = 2.47 Mbps
UL/DL connectivity pattern and associated resource allocations.

Egress rate per node = 2.43 Mbps (assuming equal UL/DL resource split)
DL connectivity pattern and associated resource allocations.

Ingress rate per node = 2.15 Mbps (assuming equal UL/DL resource split)
UL connectivity pattern and associated resource allocations.

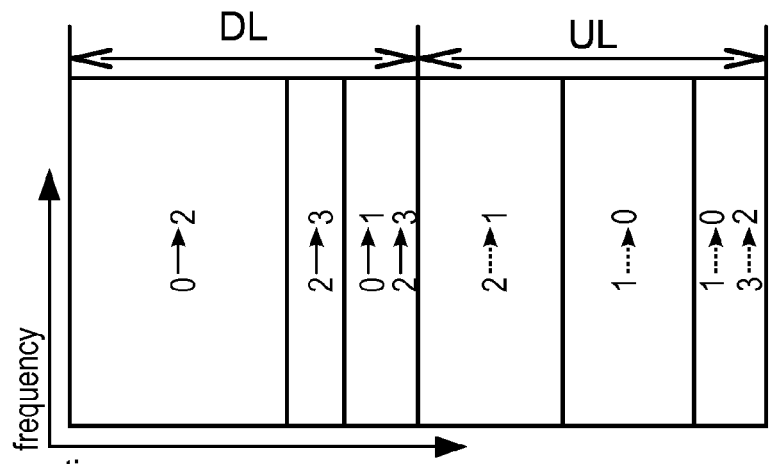
FIG. 14A Equal UL/DL resource split. TDD.
Egress rate = 2.43. Ingress rate = 2.15 Mbps.
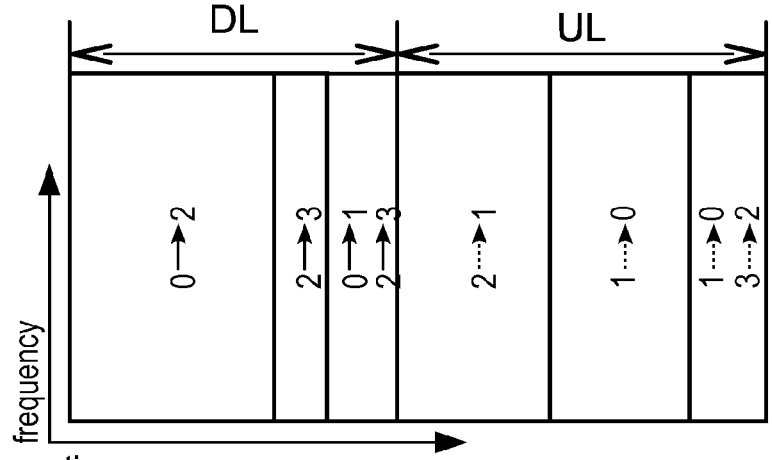
FIG. 14B Equal UL/DL rates. TDD.
Egress rate = Ingress rate = 2.28 Mbps.
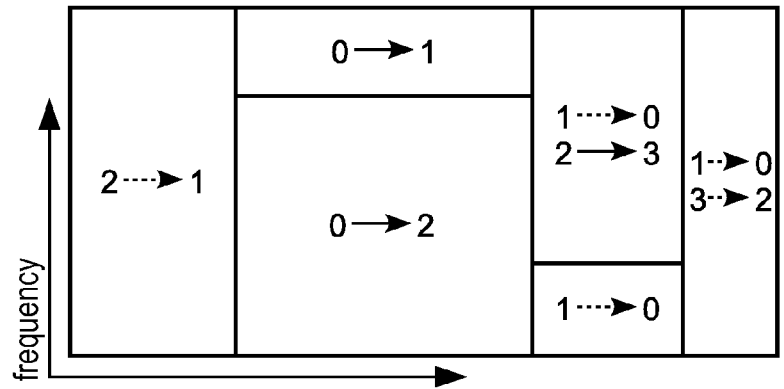
FIG. 14C Optimised UL/DL rates.
Egress rate = Ingress rate = 2.47 Mbps.

SYSTEM AND METHOD FOR DETERMINING A COMMUNICATIONS SCHEDULE FOR RELAY NODES OF A WIRELESS RELAY NETWORK

BACKGROUND OF THE INVENTION

1. Field of the Invention

The present invention relates to a system and method for determining a communications schedule (also referred to as a communications link structure) for relay nodes of a wireless relay network.

2. Description of the Prior Art

Within a wireless network, there will typically be a plurality of nodes that need to communicate with each other, and wireless communications links are established between the various nodes to support such communications. Considering a wireless telecommunications network, for a downlink communication path a transmitting node (for example a base station (BS)) may need to communicate with a plurality of recipient nodes (such as mobile stations (MSs)/items of end user equipment (UEs)). Similarly, for an uplink communication path multiple transmitting nodes (for example MSs/UEs) may need to communicate with a particular recipient node (for example a BS).

A common approach for establishing such communications links involves providing a direct communications link between a transmitting node and a recipient node, such an approach often been referred to as a single-hop implementation. Such an approach can work well when the various transmitting and recipient nodes are relatively closely spaced, but generally the throughput achievable by such arrangements rapidly decreases as the spacing between the transmitting and recipient nodes gets larger.

To alleviate such problems, it is known to provide one or more relay nodes within a wireless network to allow data to be propagated via wireless links between a plurality of the relay nodes. The various relay nodes can be arranged so as to allow a transmitting node to communicate with a recipient node via a number of intervening nodes, the intervening nodes serving to propagate the data further along the relay structure formed by the relay nodes. A relay node that forms an intervening node may in some implementations also serve as a recipient node for some communications (for example within a downlink communication path) or as a transmitting node for some communications (for example within an uplink communication path). Through the use of such a relay network, transmitting and recipient nodes are able to communicate with each other even when they are separated by a distance which would otherwise preclude such communication, due for example to an unacceptable level of attenuation of the signal if a direct communication were attempted between the nodes.

In accordance with a typical form of relay network, one or more separate relays may be provided by the relay network, and a multi-hop nearest neighbour relaying approach is taken, where each relay node transmits data to the nearest relay node within the relay to which that relay node belongs. However, whilst such an approach enables data to be transmitted over much larger distances than the earlier-described single-hop approach, the capacity required by the various communications links varies significantly. For instance, considering the downlink example where a transmitting node serves as the source of various communications traffic to a plurality of recipient nodes, the first wireless communications link between that transmitting node and the nearest relay node in the relay must have capacity to carry all of the communications traffic output from the transmitting node and destined for a recipient node covered by the relay, irrespective of which particular recipient node it is destined for. In many implementations, it can be very difficult to provide the required capacity over such a communications link to ensure reliable communication between all transmitting node/recipient node pairs.

Accordingly, it would be desirable to provide an improved mechanism for determining a communications schedule/communications link structure for routing data between a plurality of relay nodes forming a relay network.

SUMMARY OF THE INVENTION

Viewed from a first aspect, the present invention provides a method of determining a communications schedule for routing data between a plurality of relay nodes forming a wireless relay network, the communications schedule being arranged to interconnect the plurality of relay nodes by an ordered sequence of communications links, the communications links being established over a wireless resource comprising a plurality of resource blocks, the method comprising: (a) generating a plurality of candidate connectivity patterns for said ordered sequence of communications links; (b) for each candidate connectivity pattern, generating a plurality of candidate resource allocations for providing said ordered sequence of communications links in accordance with that candidate connectivity pattern; (c) for each candidate connectivity pattern, calculating a level of a performance characteristic for a selected combination of the candidate resource allocations associated with that candidate connectivity pattern; (d) based on a desired level of said performance characteristic, selecting as said communications schedule one of said candidate connectivity patterns and its associated selected combination of the candidate resource allocations whose calculated level of said performance characteristic meets said desired level; and (e) in response to a trigger condition, repeating said steps (c) and (d) in order to re-select one of said candidate connectivity patterns and its associated selected combination of the candidate resource allocations to be used as the communications schedule.

In accordance with the present invention, a particular performance characteristic is evaluated for each of a plurality of candidate connectivity patterns, and in particular for a selected combination of candidate resource allocations for each candidate connectivity pattern. The candidate resource allocations may also be referred to herein as candidate resource block utilisations, since each candidate resource allocation provides a candidate option for providing one or more of the communications links of said ordered sequence using at least one resource block (typically the actual resource block is not specified and instead is determined by a later resource block allocation operation).

Following the above evaluation stage, and having regards to a desired level of the performance characteristic, one of the candidate connectivity patterns and its associated selected combination of candidate resource allocations is then selected as the communications schedule used to interconnect the plurality of relay nodes by an ordered sequence of communications links. Furthermore, in response to a trigger condition, the performance characteristic evaluation and selection process can be re-performed in order to re-select one of the candidate connectivity patterns and its associated selected combination of candidate resource allocations to be used as the communications schedule. This enables the way in which the relay nodes are interconnected, and the manner in which resource allocations are utilised to provide the communications links between those relay nodes, to be varied over time having regards to various trigger conditions, so as to seek to optimise performance of the wireless relay network having regards to the chosen performance characteristic.

The selected combination of candidate resource allocations can take a variety of forms. However, in one embodiment the selected combination of candidate resource allocations specifies a relative usage of each candidate resource allocation in the selected combination in order to provide said ordered sequence of communications links. The relative usage can be specified in a variety of ways, for example as a fraction or as a percentage of the total available wireless resource for providing the ordered sequence of communications links.

There are a number of ways in which the calculating step (c) can be performed. However, in one embodiment that calculating step comprises performance of a linear programming function to determine the selected combination of the candidate resource allocations. This provides a particularly efficient mechanism for determining the optimal combination of candidate resource allocations having regard to the chosen performance characteristic.

In one embodiment, the selected combination of the candidate resource allocations is a weighted combination of each candidate resource allocation in said plurality of resource allocations generated at said step (b), with the relative usage of each candidate resource allocation having a value between zero and a maximum value. When a relative usage of zero is specified for a particular candidate resource allocation, this indicates that that candidate resource allocation is not to be used to provide any of the communications links of the ordered sequence. The maximum value can in principle be any value up to an absolute maximum value indicating the total available wireless resource for providing the ordered sequence of communications links.

For any given plurality of candidate resource allocations, there will typically be multiple combination of those candidate resource allocations that could be used to provide the ordered sequence of communications links in accordance with the associated candidate connectivity pattern. However, in one embodiment, the selected combination of candidate resource allocations is that combination from amongst all possible combinations that yields the highest level of said performance characteristic.

The trigger condition that causes said steps (c) and (d) to be repeated can take a variety of forms. However, in one embodiment the trigger condition comprises at least one of a change in load of the data to be routed using the communications schedule or a change in conditions affecting the communications links of the communications schedule. Hence, as variations occur in the amount of data to be routed using the communications schedule, and/or as changes in conditions affecting the quality of the radio communication of the communications links changes, the performance characteristic for all the various candidate connectivity patterns and associated resource allocations can be re-evaluated, and a reselection can take place in order to seek to optimize the relay network's performance having regards to those changes.

In one embodiment, the candidate connectivity patterns and associated candidate resource allocations are generated once at initialisation time. However, in some embodiments, one or more reconfiguration conditions can be provided which, when detected, cause the candidate connectivity patterns and associated resource allocations to be re-generated. The reconfiguration condition can take a variety of forms, but in one embodiment the reconfiguration condition comprises a change in the number of relay nodes in said plurality. Such a change may arise for a number of reasons, for example addition of one or more nodes, removal of one or more nodes, failure of one or more nodes, etc.

In one embodiment, the selected combination of resource allocations identifies the relative amount of resource blocks to be used for each resource allocation, and which communications links are to be provided by each resource allocation, but does not specifically identify the actual resource blocks to be used. Instead, in one embodiment the method further comprises the step of performing a resource block allocation operation to allocate a number of the resource blocks from said plurality of resource blocks to provide the ordered sequence of communication links in accordance with the selected combination of the candidate resource allocations of the communication schedule selected at said step (d).

In one embodiment, different resource blocks are allocated for each resource allocation in the selected combination.

The resource blocks form a plurality of orthogonal resources which can be used to provide the communications links. These orthogonal resources can be provided in a variety of ways. For example, in accordance with a "Time Division Multiple Access" (TDMA) approach, a particular frequency channel of the wireless resource can be partitioned in the time domain such that each resource block occupies a different time slot. As another example, in a "Frequency Division Multiple Access" (FDMA) approach, a band of frequencies may be partitioned, so that each individual frequency forms a resource block. In a combined TDMA/FDMA approach, a combination of time/frequency slot can be used to define each resource block.

As another example, in a "Code Division Multiple Access" (CDMA) approach, a particular frequency channel may be partitioned by applying different orthogonal codes to thereby establish a plurality of resource blocks within the frequency channel.

In one embodiment, the candidate resource allocations generated at said step (b) can be generated without having regard to the actual mechanism used to provide the individual resource blocks within the wireless resource, with the resource block allocation operation allocating particular resource blocks to provide the ordered sequence of communications links once the communications schedule has been selected at said step (d).

In one embodiment, the wireless relay network forms part of a larger wireless data network, and data external to the wireless relay network will be referred to herein as exogenous data of the wireless relay network. Conversely, data passing internally within the wireless relay network will be referred to as endogenous data of the wireless relay network. Hence, if we consider a particular relay node that has the ability to communicate with a number of components outside of the wireless relay network, as well as to propagate data onto a further relay node via one of the communications links of the wireless relay network, the data traffic between that relay node and the components outside of the wireless relay network will be referred to as exogenous data, whilst the data traffic passed over communications links of the wireless relay network between that relay node and one or more other relay nodes will be referred to as endogenous data.

In one such embodiment, the desired level of the performance characteristic identifies a desired bandwidth of the exogenous data available within at least a part of the wireless data network coupled to the wireless relay network.

In one embodiment, the plurality of relay nodes may form a downlink communication path within the wireless data network. In once such embodiment, said desired bandwidth of said exogenous data comprises a desired egress rate for exogenous data emitted from the wireless relay network by one or more chosen relay nodes.

In another embodiment the plurality of relay nodes form an uplink communication path within the wireless data network. In one such embodiment, the desired bandwidth of said exogenous data comprises a desired ingress rate for exogenous data input from the wireless data network to one or more chosen relay nodes of the wireless relay network.

Furthermore, in an alternative embodiment, the plurality of relay nodes form both a downlink communication path and an uplink communication path within the wireless data network. In one such embodiment, the desired bandwidth of said exogenous data comprises at least one of a desired egress rate for exogenous data emitted from the wireless relay network by one or more chosen relay nodes, and a desired ingress rate for exogenous data input from the wireless data network to one or more chosen relay nodes of the wireless relay network.

There are a number of ways in which the plurality of candidate connectivity patterns can be generated at said step (a). In one embodiment, the plurality of relay nodes forming the wireless relay network comprises N relay nodes, and at said step (a) a Prüfer decoding algorithm is executed to produce as each candidate connectivity pattern a spanning tree pattern derived from a Prüfer sequence, whereby the number of candidate connectivity patterns is $N^{N-2}$. By using such a Prüfer sequence approach, a reduction in the number of candidate connectivity patterns is achieved due to the number being constrained by the factor N−2.

There are a number of ways in which the plurality of candidate resource allocations can be generated at said step (b). However, in one embodiment the plurality of candidate resource allocations are determined having regards to at least one communications limitation condition, that communications limitation condition serving to reduce the number of possible candidate resource allocations.

In one embodiment, one communications limitation condition comprises a limitation that each relay node cannot simultaneously transmit data and receive data. In addition, or alternatively, one communications limitation condition comprises a limitation that each relay node cannot simultaneously transmit data to more than one relay node using the same resource allocation.

In one embodiment, the plurality of candidate resource allocations comprises at least one candidate resource allocation that provides multiple of the communications links simultaneously in a manner that does not contravene said at least one communications limitation condition. Such an approach can lead to a more efficient use of the resource blocks within the wireless relay network, and hence within the wireless data network containing that wireless network.

In one embodiment, the plurality of relay nodes use directional antennae to transmit data. The use of such directional antennae can serve to reduce interference within the wireless relay network and the wireless data network as a whole. In situations where multiple of the communications links are provided simultaneously by one of said candidate resource allocations, the directional antennae can be configured to reduce interference between those multiple communications links of the wireless relay network.

There are a number of ways in which the level of the performance characteristic for a selected combination of candidate resource allocations for each candidate connectivity pattern can be calculated. In one embodiment that calculation process comprises, for each candidate connectivity pattern, the steps of: (i) computing a channel capacity matrix identifying, for each candidate resource allocation, an endogenous data capacity for each wireless communications link to be provided by that candidate resource allocation; and (ii) performing a linear programming function to determine, as said selected combination, a weighted combination of the candidate resource allocations that identifies, for each candidate resource allocation, a relative usage amount of that candidate resource allocation required, having regard to an expected data loading, in order to support the endogenous data capacity of each wireless communications link of that candidate resource allocation.

In one embodiment, each relay node has a transmit antenna assembly whose transmit power is configurable, and during said step (i) the channel capacity matrix is computed taking into account a plurality of transmit power settings. This leads to an increase in the number of candidate resource allocations relative to an embodiment where the transmit power is fixed. By such an approach, when a particular communications schedule is then selected at said step (d), a particular selection of connectivity pattern, associated combination of candidate resource allocations, and power setting can be chosen so as to optimise the performance of the wireless relay network.

In one embodiment, the method further comprises the step of generating a load matrix for each candidate connectivity pattern to provide the expected data loading information used in said step (ii).

The relay nodes of the wireless relay network may be used at a variety of locations within a wireless data network. For example, they made be used to provide communications between an access base station and items of end user equipment within an access network. However, in one embodiment, the relay nodes of said wireless relay network are provided within a wireless feeder network used to couple access base stations of an access network with a communications network, the wireless feeder network comprising a plurality of feeder base stations coupled to the communications network and a plurality of feeder terminal relays coupled to associated access base stations, the relay nodes of said wireless relay network comprising at least one of said feeder base stations and multiple of said feeder terminal relays. More details of a suitable wireless feeder network that could include such a relay network are provided in commonly owned co-pending UK patent application GB 2,484,280 A, the entire contents of which are incorporated herein by reference. Furthermore, such a wireless feeder network will be described in more detail later with reference to the embodiment description and accompanying figures of the present application.

Viewed from a second aspect, the present invention provides a system for determining a communications schedule for routing data between a plurality of relay nodes forming a wireless relay network, the communications schedule being arranged to interconnect the plurality of relay nodes by an ordered sequence of communications links, the communications links being established over a wireless resource comprising a plurality of resource blocks, the system comprising: connectivity pattern generation circuitry configured to generate a plurality of candidate connectivity patterns for said ordered sequence of communications links; resource allocation generation circuitry configured, for each candidate connectivity pattern, to generate a plurality of candidate resource allocations for providing said ordered sequence of communications links in accordance with that candidate connectivity pattern; performance level calculation circuitry configured, for each candidate connectivity pattern, to calculate a level of a performance characteristic for a selected combination of the candidate resource allocations associated with that candidate connectivity pattern; selection circuitry configured, based on a desired level of said performance characteristic, to select as said communications schedule one of said candidate connectivity patterns and its associated selected combination of the candidate resource allocations whose calculated level of said performance characteristic meets said desired level; and said performance level calculation circuitry and said selection circuitry being responsive to a trigger condition to repeat their performance level calculation and selection operations in order to re-select one of said candidate connectivity patterns and its associated selected combination of candidate resource allocations to be used as the communications schedule.

Viewed from a third aspect, the present invention provides a storage medium storing a computer program which, when executed on a computer, performs a method of determining a communications schedule for routing data between a plurality of relay nodes forming a wireless relay network in accordance with the first aspect of the present invention. In one embodiment, the storage medium may take the form of a non-transitory storage medium.

Viewed from a fourth aspect, the present invention provides a wireless feeder network used to couple access base stations of an access network with a communications network, the wireless feeder network comprising a plurality of feeder base stations coupled to the communications network and a plurality of feeder terminal relays coupled to associated access base stations, the wireless feeder network including a wireless relay network comprising a plurality of relay nodes, the relay nodes of said wireless relay network comprising at least one of said feeder base stations and multiple of said feeder terminal relays, the wireless feeder network further comprising a controller for determining a communications schedule for routing data between said plurality of relay nodes in accordance with the method of the first aspect of the present invention.

Viewed from a fifth aspect, the present invention provides a method of determining a communications link structure for routing data between a plurality of relay nodes forming a wireless relay network, the communications link structure being arranged to interconnect the plurality of relay nodes by an ordered sequence of communications links, the communications links being established over a wireless resource comprising a plurality of resource blocks, the method comprising: (a) generating a plurality of candidate connectivity patterns for said ordered sequence of communications links; (b) for each candidate connectivity pattern, generating a plurality of candidate resource block utilisations for providing said ordered sequence of communications links in accordance with that candidate connectivity pattern; (c) calculating a level of a performance characteristic for each candidate resource block utilisation of each candidate connectivity pattern; (d) based on a desired level of said performance characteristic, selecting as said communications link structure one of said candidate connectivity patterns and one of its associated candidate resource block utilisations whose calculated level of said performance characteristic meets said desired level; and (e) in response to a trigger condition, repeating said steps (c) and (d) in order to re-select one of said candidate connectivity patterns and one of its associated candidate resource block utilisations to be used as the communications link structure.

BRIEF DESCRIPTION OF THE DRAWINGS

The present invention will be described further, by way of example only, with reference to embodiments thereof as illustrated in the accompanying drawings, in which:

FIGS. 7A to 7F illustrate the load matrices corresponding to each of the connectivity patterns of FIGS. 5A to 5F that may be computed at step 480 of FIG. 4 in accordance with one embodiment;

FIG. 7G illustrates a form of load matrix for the connectivity pattern of FIG. 5C when there are non-equal loads between each of the relay nodes in accordance with one embodiment;

FIGS. 14A and 14B illustrate candidate resource block allocations that could be used in one embodiment to implement the communications schedules of FIGS. 13A and 13B, whilst FIG. 14C illustrates candidate resource block allocations that could be used in one embodiment to implement the communications schedule of FIG. 12;

DESCRIPTION OF EMBODIMENTS

Figure 1A:
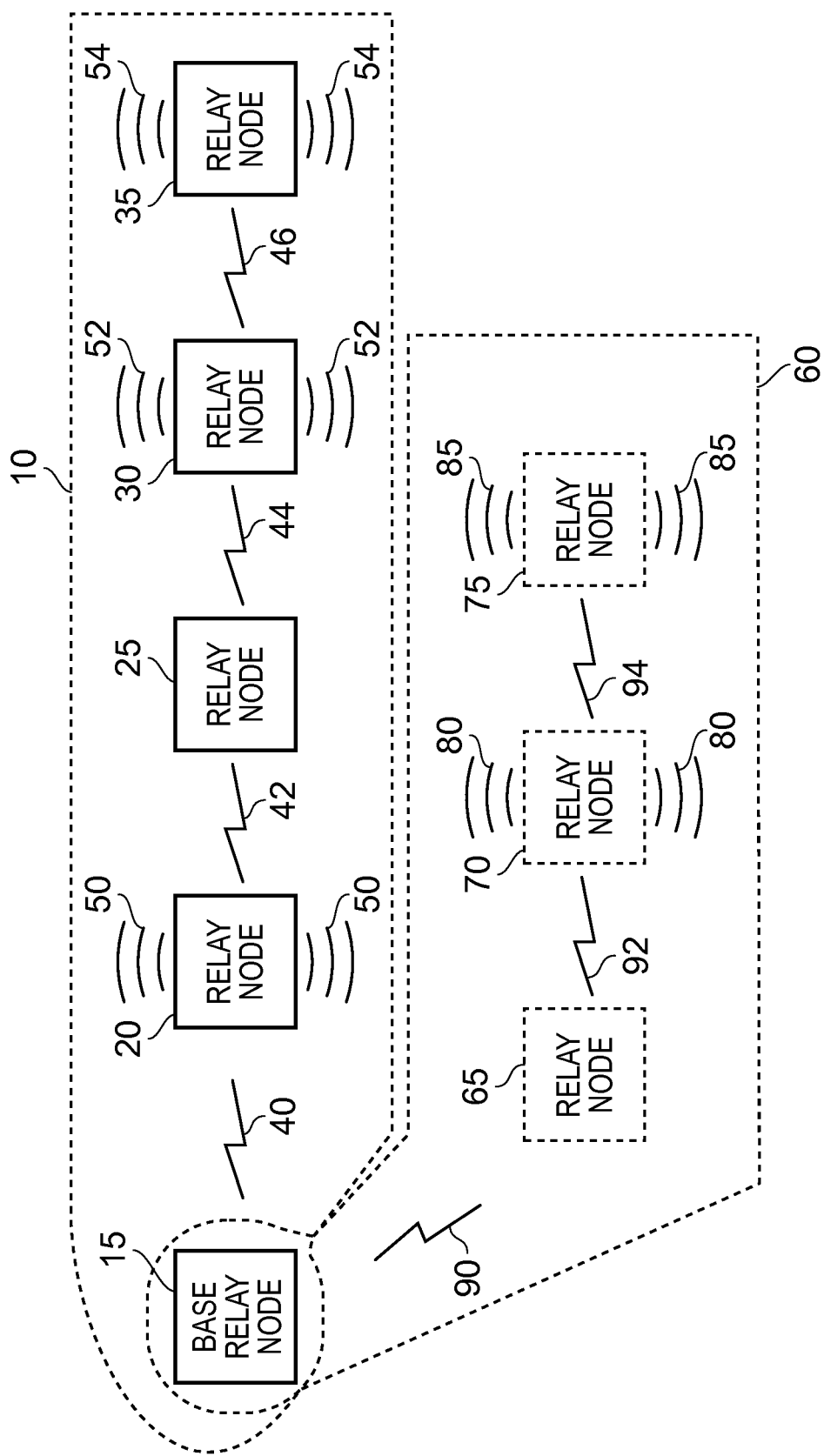
FIG. 1A schematically illustrates a wireless relay network in which techniques of embodiments of the present invention may be employed.

FIG. 1 schematically illustrates a wireless relay network in which the techniques of embodiments of the present invention may be employed. The wireless relay network shown in FIG. 1A provides a first relay 10 consisting of a base relay node 15 and various other relay nodes 20, 25, 30, 35. In accordance with the techniques of embodiments of the present invention to be described in more detail with reference to the remaining figures, a communications schedule is established between the various relay nodes of the relay 10, the communications schedule interconnecting the plurality of relay nodes by an ordered sequence of communications links. These communications links are illustrated schematically by the reference numerals 40, 42, 44 and 46 in FIG. 1A. For ease of illustration, the relay nodes within the relay 10 are shown as being interconnected in a multi-hop nearest neighbour configuration, but in accordance with the techniques of embodiments of the present invention, the various relay nodes can be interconnected in a variety of different ways, and indeed the way in which they are interconnected may vary over time having regards to changes in certain conditions such as a change in load of the data to be routed using the communications schedule of the relay, or a change in conditions affecting the communications links between the relay nodes. Whilst the wireless relay network may provide a single relay, it can alternatively provide multiple relays, as schematically illustrated by the optional additional relay 60 containing the base relay node 15 and a number of further relay nodes 65, 70, 75. For relay 60, the various communications links are illustrated by the reference numerals 90, 92, 94 and again for ease of illustration a multi-hop nearest neighbour configuration is illustrated.

Whist certain of the relay nodes may be arranged to operate solely as relays for the onward propagation of data to a further relay node (as illustrated schematically for the examples of the relay nodes 25 and 65) other relay nodes may be arranged to communicate with other components external to the wireless relay network. Hence, the relay nodes 20, 30, 35, 70, 75 have associated therewith communication links 50, 52, 54, 80, 85, respectively, which illustrate that those nodes are in communication with components external to the wireless relay network. For the purposes of the present application, the data communicated within the wireless relay network will be referred to as endogenous data, and hence any data passing over the paths 40, 42, 44, 46, 90, 92, 94 will be endogenous data. Further, any data communications between relay nodes and components external to the wireless relay network will be referred to as exogenous data, and accordingly any data passing over the communication paths 50, 52, 54, 80, 85 will be exogenous data.

In any particular deployment, there will be a certain number of relay nodes provided to form the wireless relay network, and they will typically have a particular physical deployment such that the relative distances between the various relay nodes is known. Having regards to a certain performance characteristic required of the wireless relay network, for example a particular minimum acceptable exogenous data rate to be achieved by any particular relay node, the technique of embodiments of the present invention identifies a plurality of candidate ways in which the relay nodes may be interconnected (referred to herein as a plurality of candidate connectivity patterns). Considering the example of FIG. 1A where there are eight relay nodes including the base relay node 15, then depending on the physical separation between the various relay nodes these candidate connectivity patterns may include one or more patterns where all the relay nodes are interconnected to form a single relay, various patterns where the relay nodes are interconnected to form multiple relays (such as schematically illustrated in FIG. 1A) or indeed in some instances a candidate connectivity pattern where each of the relay nodes 20, 25, 30, 35, 65, 70, 75 is directly connected to the base relay node 15.

The various communications links established between the relay nodes of the wireless relay network are established over a wireless resource comprising a plurality of resource blocks. The resource blocks form plurality of orthogonal resources which can be used to provide these wireless communications links. In accordance with embodiments of the present invention, for each candidate connectivity pattern, a plurality of candidate resource allocations are also generated, each candidate resource allocation representing a possible way of providing at least one of the communications links of the ordered sequence in accordance with the associated candidate connectivity pattern.

As will be discussed in more detail with reference to the remaining figures, a performance level analysis process can then be performed for a selected combination (which in the described embodiment is a weighted combination) of the candidate resource allocations of each candidate connectivity pattern in order to identify the performance level of the chosen performance characteristic that would be expected if that particular candidate connectivity pattern and associated weighted combination of candidate resource allocations were employed. Based on a desired level of the chosen performance characteristic, one of those candidate connectivity patterns and its associated weighted combination of resource allocations can then be chosen whose calculated performance level at least meets the desired level. In one particular embodiment, the particular combination of candidate connectivity pattern and weighted combination of candidate resource allocations that gives the best performance level is chosen.

As the performance may vary dependent on conditions such as the data loading within the wireless relay network, or changes in environmental conditions that may affect the radio resources, in one embodiment the technique is arranged to be responsive to such conditions to trigger a re-evaluation of the performance levels for a selected weighted combination of candidate resource allocations of each candidate connectivity pattern, and to then change the communications links structure accordingly dependent on which candidate connectivity pattern and associated weighted combination of candidate resource allocations is the most appropriate having regards to the recalculated performance levels. Hence the manner in which the relay nodes are interconnected, and the manner in which resource blocks are provisioned to provide the communications links, can be varied over time having regards to changes in conditions, thereby providing a particularly flexible and adaptive mechanism for seeking to optimize the performance of the wireless relay network.

Figure 1B:
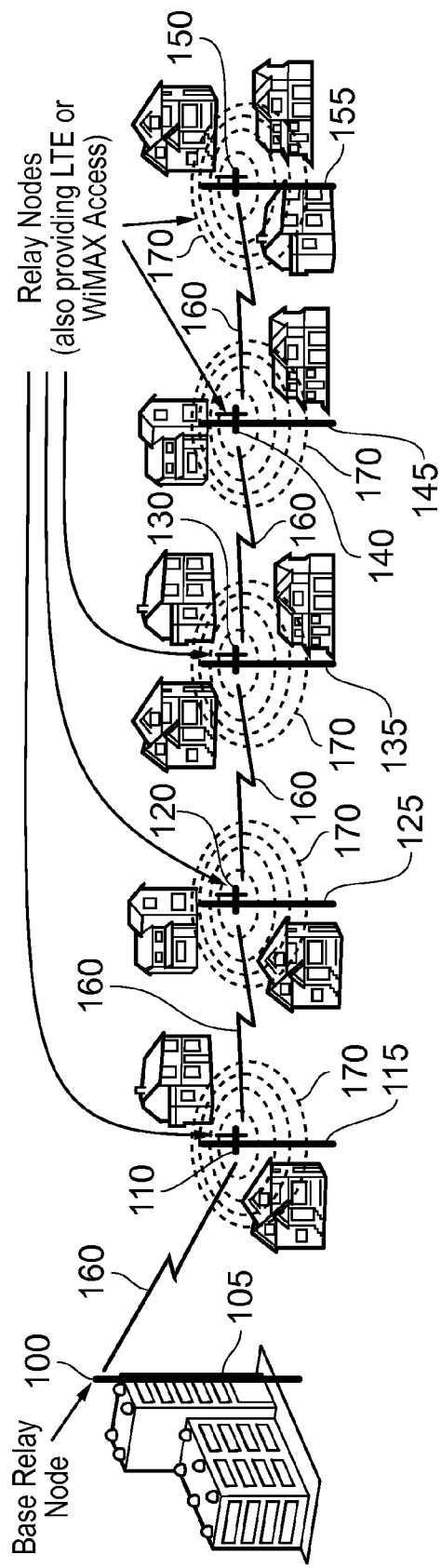
FIG. 1B provides a further schematic illustration of a wireless relay network used in one embodiment.

FIG. 1B illustrates a particular example deployment of a wireless relay network in accordance with one embodiment. In this example, the base node 100 is mounted at an appropriate location, for example on a mast 105 at a base site, and then a plurality of relay nodes 110, 120, 130, 140, 150 are provided at a variety of locations where it is convenient to provide those relay nodes. The relay nodes would typically be of a relatively small size, and hence can be mounted in a variety of locations, for example on street furniture such as street lights. For the sake of illustration in FIG. 1B, they are shown schematically as being mounted upon masts 115, 125, 135, 145, 155, respectively. Communications links 160 are established between the various relay nodes 100, 110, 120, 130, 140, 150 to provide the wireless relay network in accordance with a particular selected communications links structure (i.e. the selected communication schedule). In one embodiment, directional antennae are provided to establish those links, the use of such directional antennae allowing for high quality links to be established with reduced co-channel interference.

In this example, each of the relay nodes 110, 120, 130, 140, 150 is provided in association with an access base station of an access network, the access base station being provided as a separate component, or integral to the relay node. The base station serves to communicate with a variety of items of end user equipment via an access network 170. For the purposes of illustration, it is assumed that omni-directional antennae are used for this purpose, but of course it will be appreciated that any other suitable antennae configuration can be used. The items of end user equipment may be mobile or fixed, and any of a number of known wireless communication protocols may be used to effect the wireless links 170. For example, in one embodiment such wireless links may be constructed using WiMAX or LTE air interfaces.

Figure 2A:
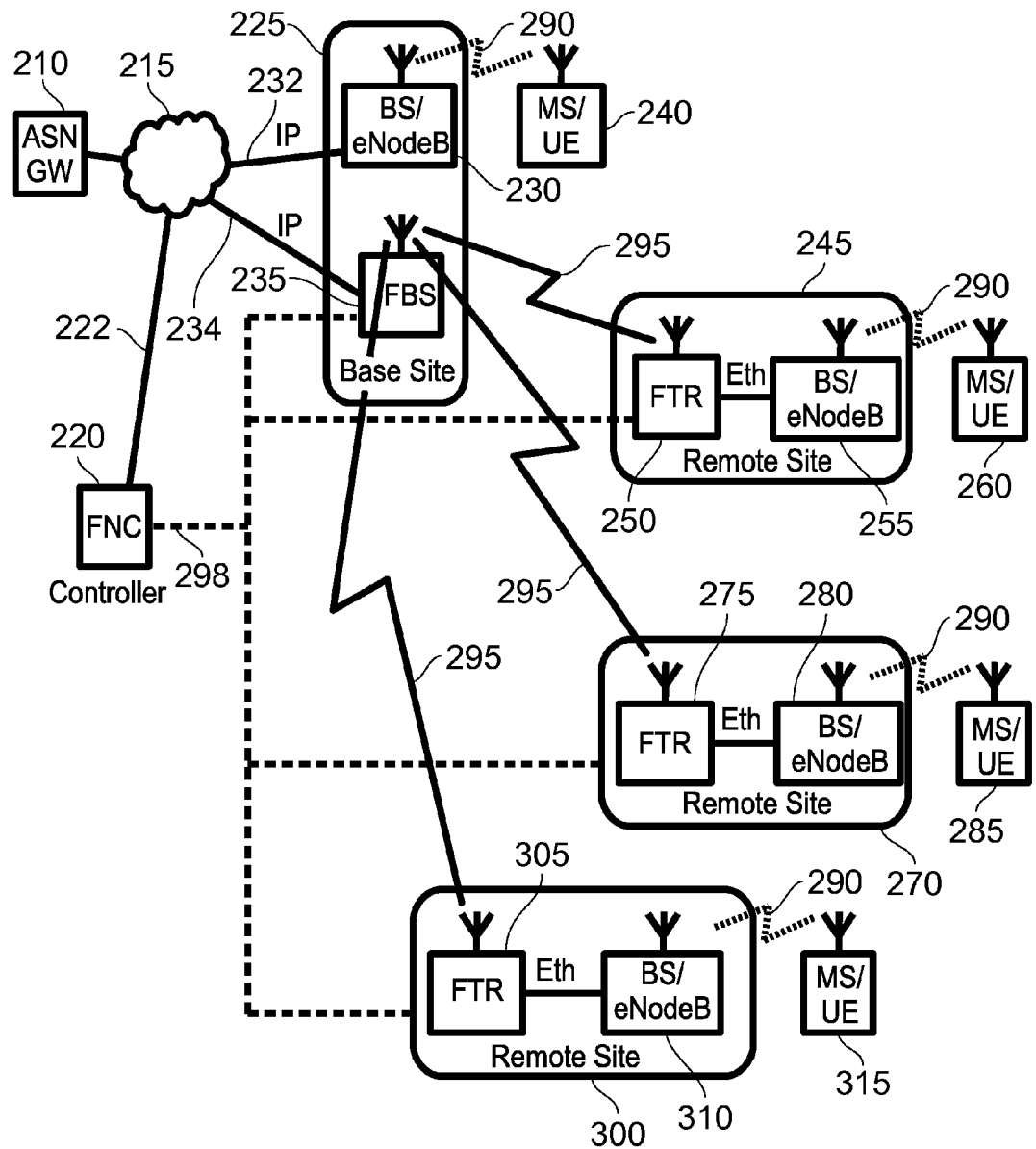
FIGS. 2A to 2C are diagrams schematically illustrating a network architecture including a wireless feeder network having a wireless relay network in accordance with one embodiment.

FIG. 2A is a block diagram schematically illustrating a network architecture including a wireless feeder network in accordance with one embodiment. As shown in FIG. 2A, a number of access base stations 230, 255, 280, 310 are provided in the conventional manner to communicate via a wireless air interface 290 with a number of mobile stations/items of end user equipment 240, 260, 285, 315. Whilst for simplicity, each base station 230, 255, 280, 310 is shown as communicating with a single item of end user equipment, it will be appreciated that in practice such base stations form point-to-multipoint devices enabling a plurality of items of end user equipment to communicate with an individual base station. As mentioned earlier, the items of end user equipment may be mobile or fixed, and any one of a number of known wireless communication protocols may be used to effect the wireless links 90.

The access network consisting of the various base stations 230, 255, 280, 310 and items of end user equipment 240, 260, 285, 315 is typically connected via a communications infrastructure 215 with an access services network gateway 210 to enable inbound communication to be forwarded to the items of end user equipment and for outbound communication to be routed to some other network via the access services network gateway 210. This requires each base station to be provided with a backhaul connection to the communications infrastructure 215. The base station 230 is shown provided with a traditional wired backhaul connection 232 to the communications infrastructure 215. However, in accordance with embodiments, other base stations 255, 280, 310 can be coupled to the communications infrastructure 215 via a wireless feeder network consisting of a plurality of feeder base stations 235 coupled to the communications infrastructure 215, and a plurality of feeder terminal relays 250, 275, 305 coupled to associated access base stations. The feeder base stations 235 and feeder terminal relays 250, 275, 305 communicate via a feeder air interface 295. Each feeder base station (FBS) forms a wireless point-to-multipoint hub which provides connectivity between a wired infrastructure and remote sites 245, 270, 300. Each feeder terminal relay in FIG. 2A provides the feeder end-point functionality. Accordingly, it terminates the feeder wireless link and, in the first instance, provides an interface to one or more co-located access base stations. Whilst the locations in which the feeder base stations and feeder terminal relays are located may be varied, in one example the feeder base stations will typically be installed on a tower or building roof-top whilst the feeder terminal relays will typically be installed either below the roof-line, on a building, or on street furniture, such as a lamp post or utility pole.

In accordance with the architecture illustrated in FIG. 2A, a number of base sites and a number of remote sites are established. A base site 225 receives a wired backhaul connection 232, 234 and in the example base site 225 illustrated in FIG. 2A, the base site includes not only a feeder base station 235 but also an access base station 230 of the access network. However, in some embodiments a base site may only include a feeder base station 235 and no access base station.

Each remote site 245, 270, 300 includes a feeder terminal relay 250, 275, 305 and an associated access base station 255, 280, 310. In one embodiment, the feeder terminal relay and associated access base station are physically separate devices, and may be coupled to each other via a variety of connections, for example an Ethernet connection such as shown in FIG. 2A. In an alternative embodiment, the feeder terminal relay and access base station may be incorporated into a single unit used to form a remote site.

The wireless feeder network provides a wireless backhaul solution via the associated feeder air interface 295 that partitions the resource blocks of the wireless resource used to implement the feeder air interface 295 in a way that ensures high spectral efficiency. By achieving high spectral efficiency, it is ensured that more bandwidth is available for the actual transfer of useful traffic through the access network. In one embodiment, the feeder air interface is adaptive, in that the allocation of the resource blocks amongst the various feeder links connecting individual feeder terminal relays with an associated feeder base station is altered during use, for example to take account of different traffic conditions, thereby ensuring that high spectral efficiency is maintained in the presence of varying operating conditions.

In one embodiment, one or more feeder network controllers 220 are used to control the wireless feeder network with the aim of ensuring that high spectral efficiency is maintained. The dotted line 298 in FIG. 2A illustrates this logical control of the feeder network controller 220 over the various elements of the wireless feeder network. In practice, the control messages are routed to the various feeder base stations 235 and feeder terminal relays 250, 275, 305 via the wired backhaul connections 222, 234 and the feeder links provided by the feeder air interface 295. The feeder network controller is responsible for configuring the wireless feeder network, monitoring its performance in use, and continually optimising its configuration.

In accordance with the embodiments described herein, the feeder base station 235 in combination with the various feeder terminal relays 250, 275, 305 is arranged to form a wireless relay network, and accordingly the feeder base station and feeder terminal relays form relay nodes. Further, the manner in which the various relay nodes are interconnected, and the resource block utilisation used for the communications links between the various relay nodes can be varied over time to take account of changes in various operating conditions and operating load. In the example of FIG. 2A, it is assumed that each feeder terminal relay is directly connected to its associated feeder base station via a direct communication path. For implementations where the various feeder terminal relays are all relatively close to the associated feeder base station, such a configuration may be appropriate, as it may provide the best performance level when compared with other candidate connectivity patterns.

Figure 2B:
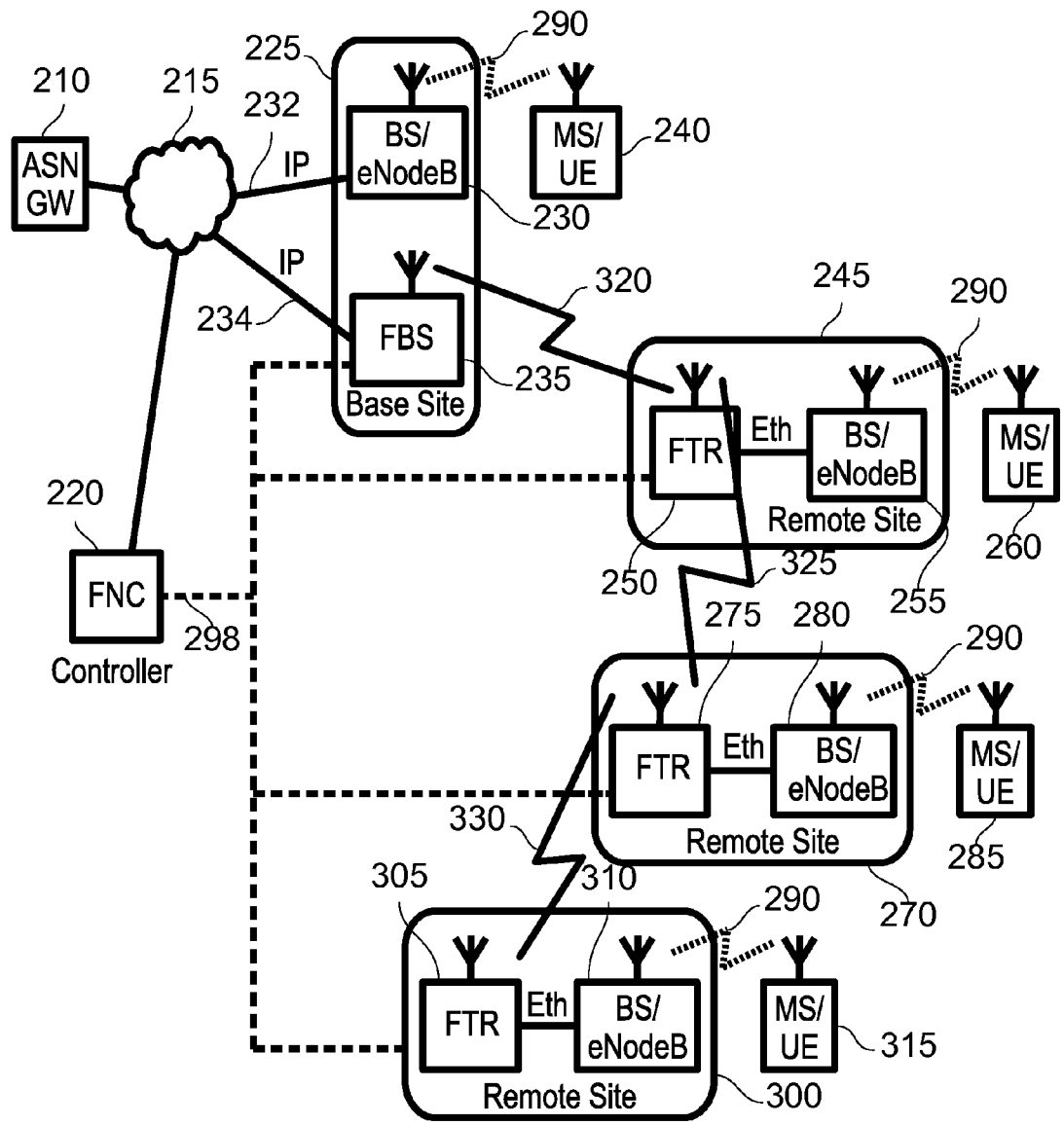
Figure 2C:
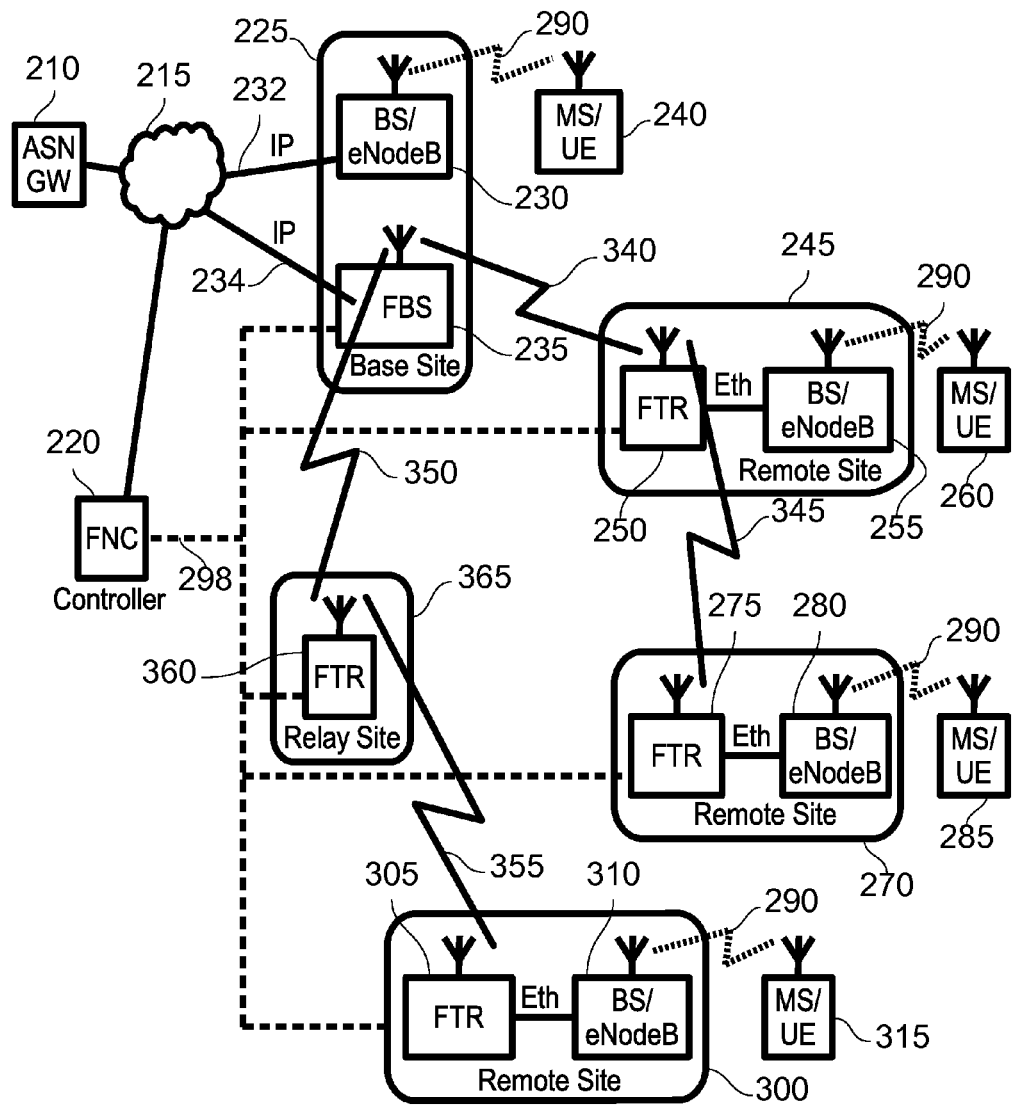

However, as shown in FIGS. 2B and 2C, many other configurations are possible. In the example of FIG. 2B, each of the feeder terminal relays 250, 275, 305 is interconnected with the associated feeder base station 235 in a multi-hop nearest neighbour configuration, via the communications links 320, 325, 330. Such an approach can be a suitable configuration when the feeder terminal relays are separated by larger distances, and particularly where certain of the feeder terminal relays are at a relatively large distance from their associated feeder base station.

FIG. 2C illustrates a further example where the wireless relay network in fact forms two separate relays. In this example, a relay site 365 is introduced containing a feeder terminal relay 360. A first relay is constituted by the feeder base station 235 in combination with the feeder terminal relays 250, 275, whilst a second relay is established by the feeder base station 235 in combination with the feeder terminal relays 360, 305. The communications links 340, 345 are established for the first relay, whist the communications links 350, 355 are established for the second relay.

FIGS. 2A to 2C only illustrate three example configurations, and it will be appreciated that there are many different ways in which the various feeder terminal relays may be interconnected in any particular implementation. Further, in the examples of FIGS. 2A to 2C, it is assumed that the communications links are established in a relatively linear manner between one relay node and an adjacent relay node, but as will be apparent from the later description of FIGS. 5A to 5F, this is not necessary and more complex connectivity patterns may be used where appropriate.

Figure 3:
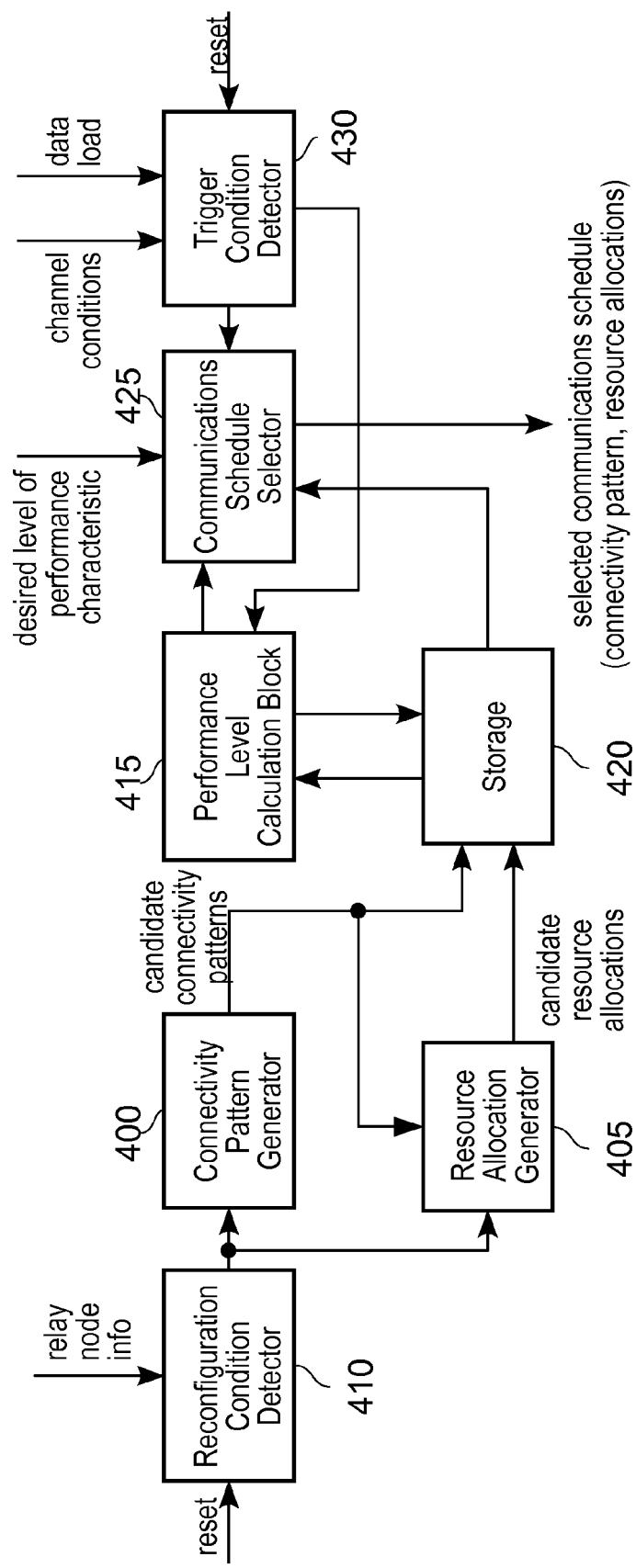
FIG. 3 is a block diagram illustrating a system used in one embodiment to determine a communications schedule for routing data between a plurality of relay nodes forming the wireless relay network.

FIG. 3 illustrates the main components of the system used to determine the communications schedule for routing data between the plurality of relay nodes forming the wireless relay network in accordance with one embodiment. In one embodiment, this system is embodied by components provided within the feeder network controller 220, whilst in another embodiment this system may be embodied by components provided within the feeder base station.

Figure 5A:
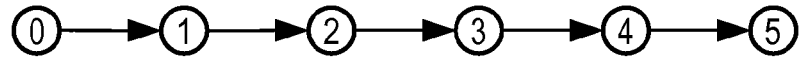
FIGS. 5A to 5F illustrate various examples of connectivity patterns that may be generated in accordance with one embodiment.
Figure 5B:
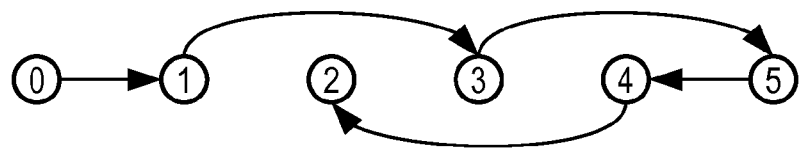
Figure 5C:
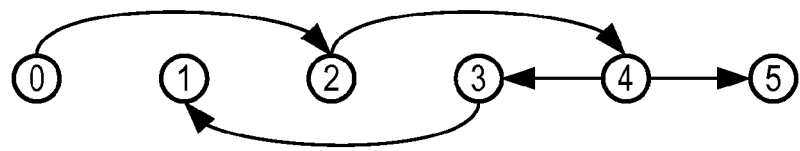
Figure 5D:
Figure 5E:
Figure 5F:
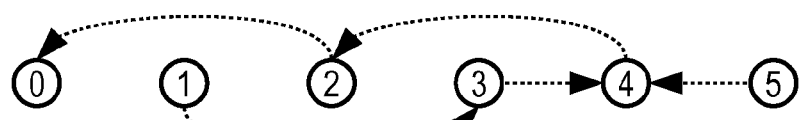
Figure 6:
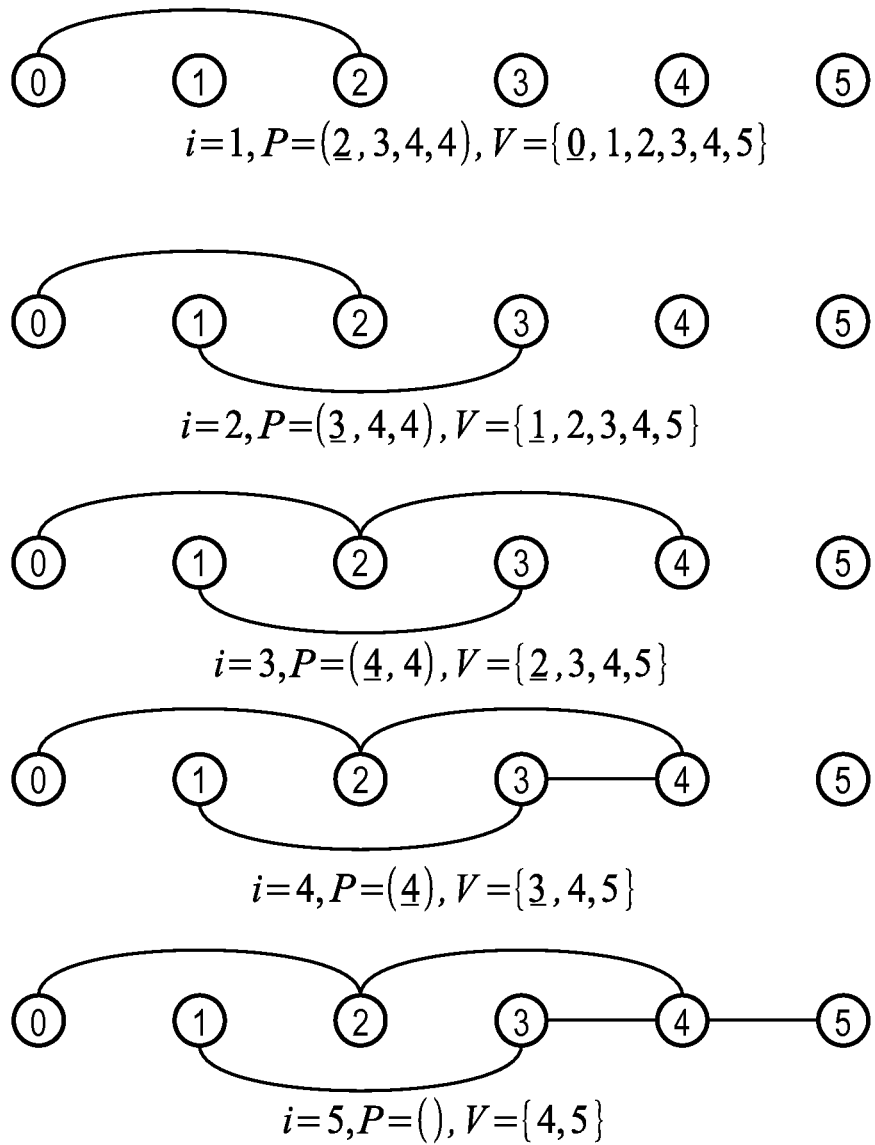
FIG. 6 schematically illustrates how the connectivity pattern of FIG. 5C may be generated from a Prüfer sequence.

A connectivity pattern generator 400 is provided for generating a plurality of candidate connectivity patterns, as will be discussed in more detail later with reference to FIGS. 4 to 6. In addition, a resource allocation generator 405 is used to generate, for each candidate connectivity pattern, a plurality of candidate resource allocations for providing an ordered sequence of communications links in accordance with that candidate connectivity pattern. This process will be described in more detail later with reference to FIGS. 4, 8A and 8B. Both the connectivity pattern generator 400 and resource allocation generator 405 are controlled by a reconfiguration condition detector 410. On a reset condition, such as system initialisation, the reconfiguration condition detector 410 will cause the connectivity pattern generator 400 to generate a plurality of candidate connectivity patterns, and the resource allocation generator 405 to generate a plurality of candidate resource allocations for each candidate connectivity pattern, and these candidate connectivity patterns and associated candidate resource allocations will be stored within the storage 420.

Further, in one embodiment, the reconfiguration condition detector 410 monitors certain relay node information, and changes in that relay node information may cause the reconfiguration condition detector to instruct the connectivity pattern generator 400 and resource allocation generator 405 to repeat their candidate connectivity pattern and candidate resource allocation generation activities in order to produce a revised set of candidate connectivity patterns and associated candidate resource allocations for storing in the storage 420. This may be appropriate, for example, if further relay nodes are added, or if one or more relay nodes are removed.

The system also includes a performance level calculation block 415 and a communications schedule selector 425, both of which are controlled by a trigger condition detector 430.

On receipt of a reset signal, such as at initialisation time, the trigger condition detector 430 will activate the performance level calculation block 415. Once the candidate connectivity patterns and associated candidate resource allocations have been generated by the connectivity pattern generator 400 and the candidate resource allocation generator 405, the performance level calculation block is arranged to calculate a level of a chosen performance characteristic for a weighted combination of the candidate resource allocations of each candidate connectivity pattern. This process will be described in more detail later with reference to the flow diagram of FIG. 9. Once the performance levels have been calculated by the performance level calculation block 415, the communications schedule selector 425 is then arranged to select as the communications schedule one of the candidate connectivity patterns and its associated weighted combination of candidate resource allocations having regards to a desired level of the chosen performance characteristic. The desired level may be fixed, or may be reprogrammable as required.

Once the selected communications schedule has been produced by the system of FIG. 3, then a resource block allocation mechanism will be used to allocate particular resource blocks to the various communications links required in accordance with the selected communications schedule. This resource block allocation mechanism may reside within the FNC 220, or at least part of the functionality of the resource block allocation mechanism may be provided within each feeder base station 235.

In one embodiment, the trigger condition detector 430 monitors various other conditions within the wireless relay network, such as the data loading and the channel conditions, and when those conditions change more than some threshold amount, the trigger condition detector issues a control signal to the performance level calculation block 415 and the communications schedule selector 425 to cause the performance level evaluation process to be re-performed, and thereafter a new communications schedule to be selected in accordance with the revised performance level information. This enable the configuration of the wireless relay network, and the resource allocation, to be varied over time taking account of such conditions.

Figure 4:
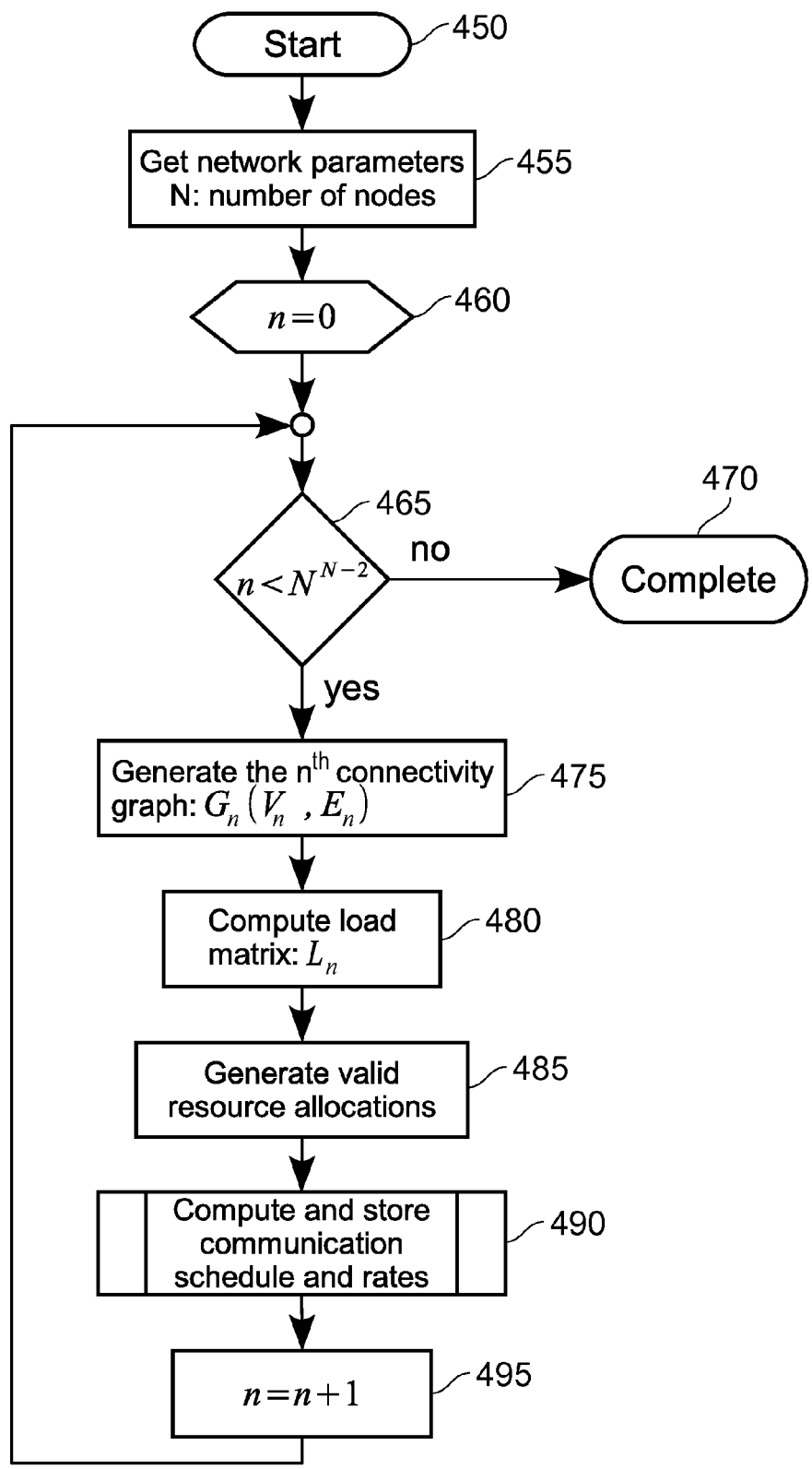
FIG. 4 is a flow diagram illustrating steps performed by the connectivity pattern generator, resource allocation generator and performance level calculation block of FIG. 3 in accordance with one embodiment.

FIG. 4 is a flow diagram illustrating the steps performed by the connectivity pattern generator 400, resource allocation generator 405 and performance level calculation block 415 of FIG. 3 in accordance with one embodiment. The process starts at step 450, whereafter various network parameters are obtained at step 455, in particular a value N specifying the number of relay nodes within the wireless relay network. Thereafter the variable n is set equal to zero at step 460 and thereafter at step 465 it is determined whether $n<N^{N-2}$. In one embodiment, a Prüfer decoding algorithm is executed to produce each candidate connectivity pattern, and when using such an approach a total of $N^{N-2}$ candidate connectivity patterns will be generated if the wireless relay network contains N nodes.

Accordingly, if at step 465 it is determined that n is not less than $N^{N-2}$ then this indicates that the process is complete, as indicated by the box 470. However, assuming n is less than $N^{N-2}$ then the process proceeds to step 475 where the n-th candidate connectivity pattern is generated, such connectivity patterns also being referred to herein as connectivity graphs. FIGS. 5A to 5F show example connectivity patterns that may be produced for a wireless relay network consisting of six relay nodes. FIGS. 5A to 5C illustrate three different candidate connectivity patterns for a downlink communication path, where relay node 0 is the source node, for example a feeder base station such as the feeder base station 235 of FIG.

2A. FIGS. 5D to 5F illustrate corresponding connectivity patterns for an uplink communication path where node 0 is the sink node, again in the example of FIG. 2A this for example being the feeder base station 235. As will be apparent from a comparison of FIGS. 5A to 5C with FIGS. 5D to 5F, the connectivity patterns are identical, other than the direction of data flow. However, a number of the parameters that are used to calculate the performance levels of the various connectivity patterns, such as the channel matrix and load matrix that will be described later, will vary dependent upon whether the relay nodes are being used to provide a downlink communication path or an uplink communication path.

As mentioned earlier, in one embodiment the various connectivity graphs are generated using a Prüfer decoding algorithm, which is described for example in "Spanning Trees and Optimisation Problems", section 1, by Wu, Bang Ye and Chao, Kun-Mao, Chapman and Hall—CRC, 2004. However, for completeness, FIG. 6 illustrates by way of example how the connectivity pattern of FIG. 5C is created from a Prüfer sequence.

Table 1 below summarises the Prüfer decoding algorithm:

TABLE 1

Prüfer Decoding Algorithm

Input: A Prüfer sequence $P = (p_1, p_2, ..., p_{N-2})$ of length $N - 2$.
Output: Undirected graph $\overline{G}_n(\overline{V}_n, \overline{E}_n)$.
  Derive number of edges/vertices: $N \leftarrow |P| + 2$
  Compute the index number: $n \leftarrow \Sigma_{k=1}^{N-2} N^{N-2-k} p_k$.
  Assign the set of vertices: $\overline{V}_n \leftarrow \{0, 1, ..., N-1\}$.
  Initialize edge set $\overline{E}_n \leftarrow \{\}$.
  Initialize local variable $V = \overline{V}_n$.
  for $i = 1$ to $N - 2$ do
    $v \leftarrow$ the smallest element of the set V that does not occur in P
    Form the $i^{th}$ edge and add it into the edge list: $\overline{E}_n \leftarrow \overline{E}_n \cup \{p_i, v\}$.
    Remove v from the set V: $V \leftarrow V - \{v\}$.
    Remove the element $p_i$ from the sequence P: $P \leftarrow (p_{i+1}, p_{i+2}, ..., p_{N-2})$.
  Add the final edge: $\overline{E}_n \leftarrow \overline{E}_n \cup V$ Consider the Prüfer sequence P=(2, 3, 4, 4). FIG. 6 illustrates the steps to construct an undirected spanning tree from P. During the first iteration, i=1, P=(2, 3, 4, 4), V=[0, 1, 2, 3, 4, 5]. The smallest vertex in V that does not appear in P is 0. Thus the first edge is constructed from the first element of P and v, i.e. {2,0}. 2 and 0 are removed from P and V, respectively. During the second iteration, i=2, P=(3, 4, 4) and V=[1, 2, 3, 4, 5]. 1 is identified in V for being the smallest number and not appearing in P. The first element 3 of P and 1 in V are removed respectively. The operations are repeated until V contains only two elements. At this very last step, V becomes the final element in the edge set.

Once the n-th connectivity graph has been generated at step 475, the load matrix is then computed at step 480. FIGS. 7A to 7F schematically illustrate the load matrices generated for the example connectivity patterns of FIGS. 5A to 5F, respectively. In these examples, it is assumed that each relay node has an equal load, that unit of load being equal to 1. Hence, considering the example of FIG. 5A, it will be seen that the communications link from relay node 0 to relay node 1 needs to carry five units of load as indicated by the entry "5" in FIG. 7A in the entry identifying the link from node 0 to load 1. Similarly, the communications link from relay node 1 to relay node 2 needs to carry 4 units of load, as indicated by the "4" in the table of FIG. 7A against the entry for the communications link between relay node 1 and relay node 2. The rest of the load matrix is completed in an analogous manner, the reference "N" indicating a null entry. The null entries relate to communications links that are not provided in accordance with the associated candidate connectivity pattern.

Whilst in the examples of FIG. 7A to 7F, a uniform load for every relay node has been considered, this is not essential, and load matrices may instead accommodate none equal loads. This is illustrated schematically by the example of FIG. 7G, which gives the general load matrix for the example connectivity pattern of FIG. 5C. In this load matrix, the symbol $l^x$ denotes the load of relay node x.

Figure 8A:
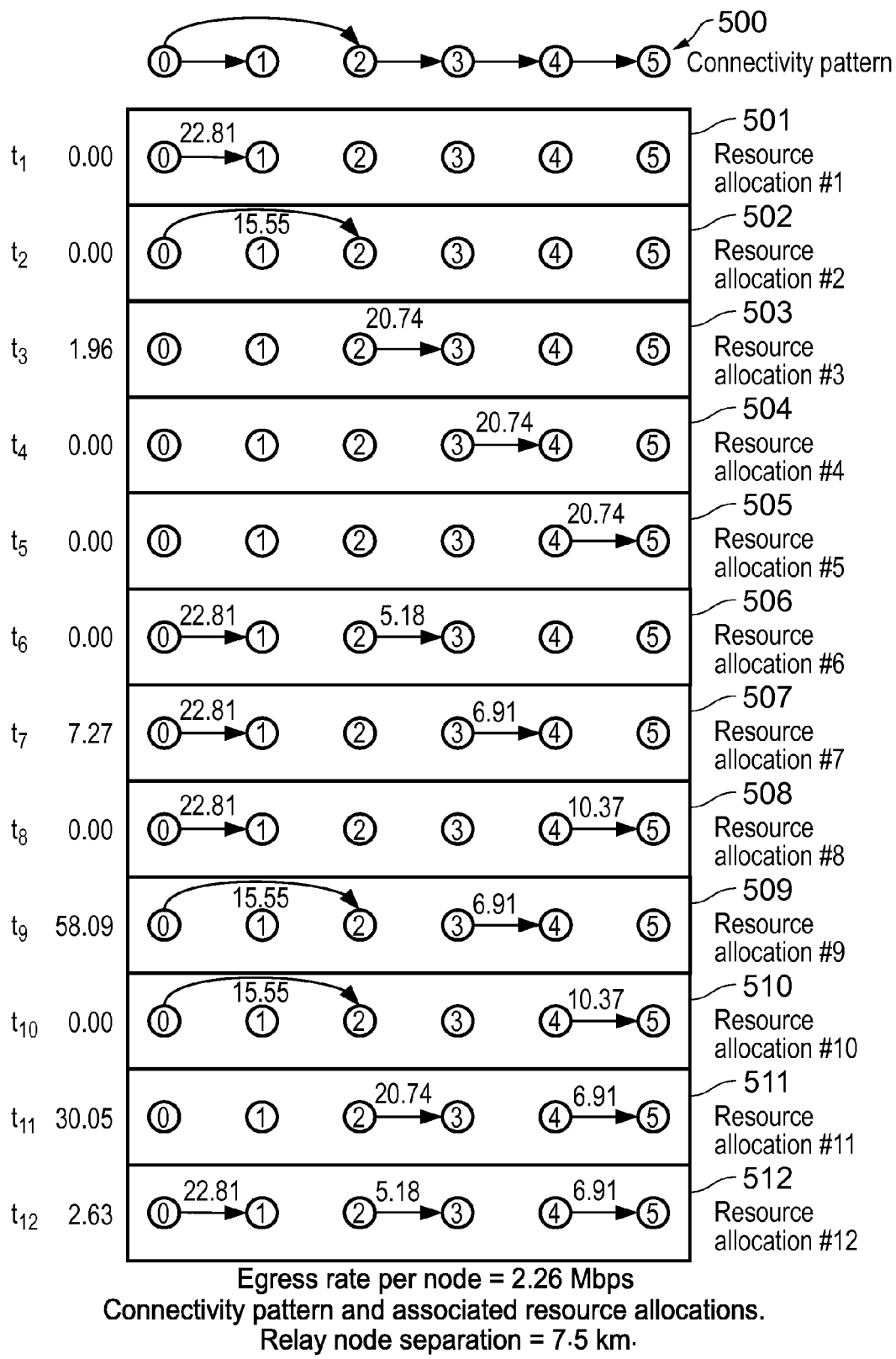
FIGS. 8A and 8B illustrate examples of candidate resource allocations that may be generated for two different connectivity patterns in accordance with one embodiment.

Once the load matrix has been generated at step 480, the process proceeds to step 485, where valid resource allocations are generated (which may also be referred to as firing graphs). FIG. 8A illustrates a connectivity graph 500 and its associated firing graphs 501 to 512. Likewise 8B illustrates an alternative connectivity graph 520 and its associated firing graphs 521 to 532. Each firing graph provides a resource allocation, where one or more specified transmitting nodes can use the same resource block(s) to carry out a wireless communication from the specified transmitting node(s).

Figure 8B:
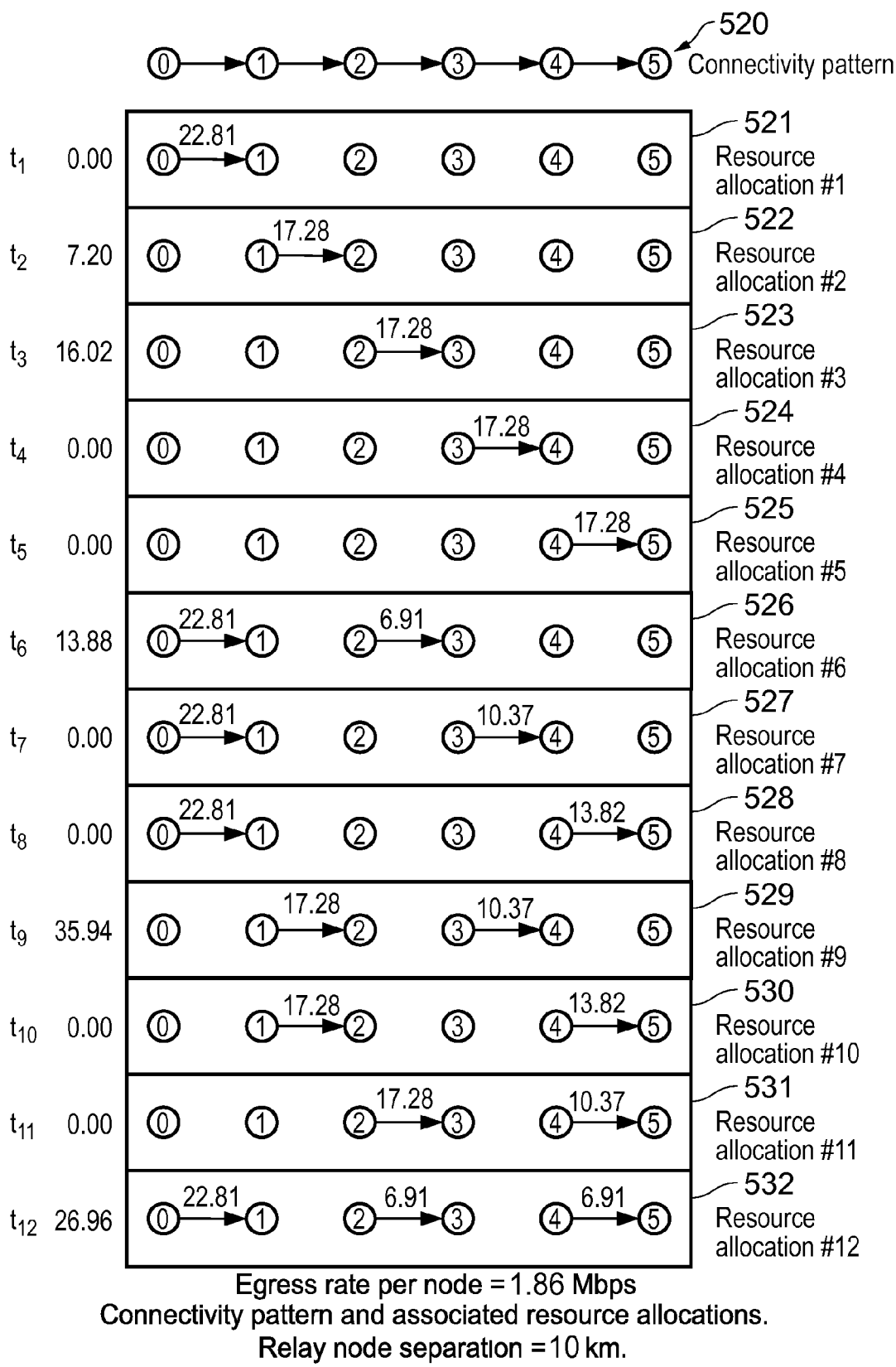

Taking as an example the sixth firing graph 526 of FIG. 8B, if this firing graph 526 is used, this will mean that at any time instant the same resource block(s) are re-used for the communication from relay node 0 to relay node 1 and from relay node 2 to relay node 3. Such an example is referred to as having one interfering node. In the example of FIG. 8B, firing graphs 526 to 531 all have one interfering node. The firing graph 532 in FIG. 8B illustrates a resource allocation with two interfering nodes, since three communications links are simultaneously supported. For firing graphs 521 to 525, communication is carried out without the presence of interference.

It will be appreciated that FIGS. 8A and 8B illustrate only a subset of the various firing graphs that may be provided from their associated connectivity graph, these being those considered to be valid firing graphs. Strictly speaking, a firing graph is a spanning subgraph of a connectivity graph.

In one embodiment, the plurality of valid firing graphs are determined having regard to at least one communications limitation condition. Various communications limitation conditions can be used. For example, in one embodiment one communications limitation condition comprises a limitation that each relay node cannot simultaneously transmit data and receive data. This may also be referred to as the time division duplex (TDD) limitation. Another limitation condition that may be applied either instead of the TDD limitation or in addition to it, is that each node cannot simultaneously transmit data to more than one node using the same resource allocation. This may also be referred to as the antenna switching limitation. In particular, in one embodiment the antenna of the relay nodes employ directional antennae to direct their transmissions to the intended target recipient relay node, and accordingly it is not possible to transmit data simultaneously to more than one relay node.

Returning to FIG. 4, once valid resource allocations have been generated at step 485, the process schematically illustrated by step 490 is performed in order to compute and store the communications schedule and rates for the optimum weighted combination of the firing graphs associated with the n-th connectivity graph, having regard to a chosen performance characteristic. This process will be described in more detail later with reference to FIG. 9.

The process then proceeds to step 495, where the variable n is incremented, and the process returns to step 465. Once it is determined at step 465 that n is no longer less than $N^{N-2}$, then the process branches to step 470, where the process is complete. At this point, all of the candidate connectivity graphs and all of the associated valid firing graphs have been computed, and the performance level (for the chosen performance characteristic) for all of those various connectivity graphs and an associated firing graph combination has been evaluated.

As mentioned earlier with reference to FIG. 3, at this point the communications schedule selector 425 is then arranged to select, as the communications schedule to be used, one of the candidate communication schedules (i.e. one of the candidate connectivity patterns and its associated weighted combination of candidate resource allocations) produced by the process of FIG. 4, having regards to a desired level of the chosen performance characteristic. The desired level may be fixed, or may be reprogrammable as required. Typically the communications schedule selector will select the candidate communication schedule with the highest level of the chosen performance characteristic where there are multiple candidate communication schedules that meet or exceed the desired level. Hence, by way of example, if the chosen performance characteristic is a bandwidth of exogenous data (typically an egress rate for a downlink communication path and an ingress rate for an uplink communication path), the communications schedule selector will select the candidate communication schedule with the highest bandwidth.

Figure 9:
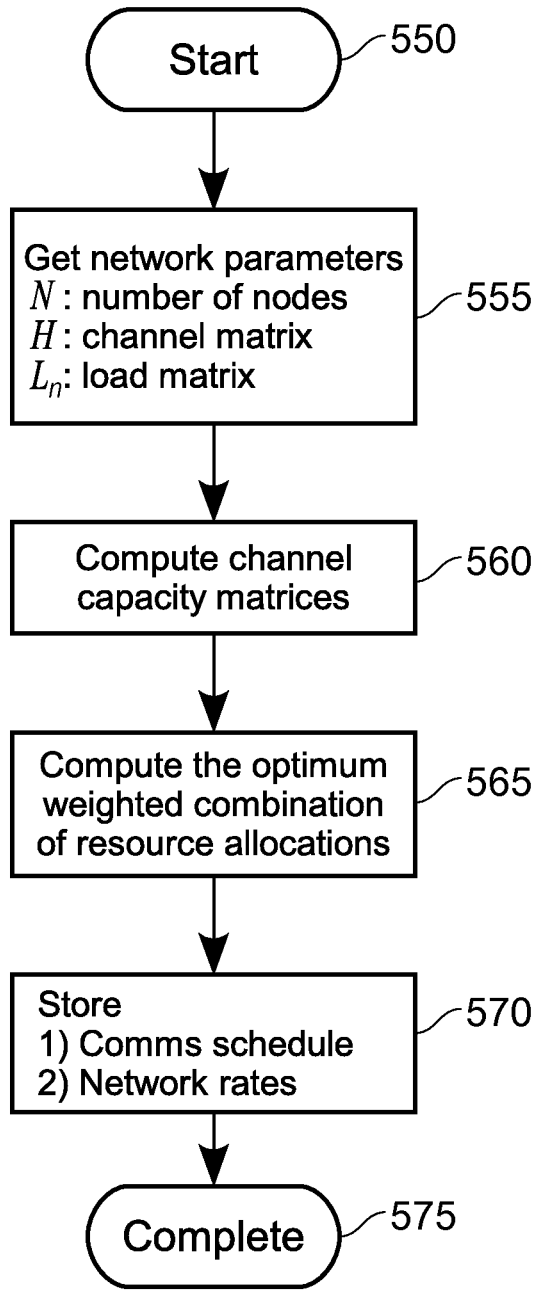
FIG. 9 is a flow diagram illustrating the general sequence of steps performed to implement step 490 of FIG. 4 in accordance with one embodiment.

FIG. 9 is a flow diagram illustrating the general sequence of steps performed to implement step 490 of FIG. 4 in accordance with one embodiment. The process starts at step 550, whereafter various system parameters are obtained at step 555, such as the number N of nodes in the wireless relay network, a channel matrix H, and the load matrix L as computed in step 480 of FIG. 4.

The channel matrix H is derived via a sounding process. In particular, the sounding process involves a given element (feeder base station or feeder terminal relay) of the wireless feeder network transmitting a known sounding signal, and corresponding elements (feeder terminal relays or feeder base stations respectively) of the wireless feeder network then receiving that sounding signal. On this basis, channel metrics can be derived from the sounding information. These channel metrics can take a number of forms including (but not limited to) channel impulse responses, complex channel frequency responses, frequency dependent co-variance matrices of the received signals, frequency dependent eigenmodes and so on. These metrics (or a combination of such metrics) provide a system wide view of the quality of the wireless channels in the network.

As will be understood by those skilled in the art, there are various mechanisms by which channel sounding can be performed. Commonly owned co-pending UK patent application GB2,484,279A, the entire contents of which are hereby incorporated by reference, describes a particular technique that could be used, where possible interference in the sounding process is alleviated. In particular, due to overlapping visibility regions of each feeder base station, if each feeder base station were to perform its channel sounding process entirely independently of the other feeder base stations in the wireless feeder network, interference between the channel sounding processes could occur. For example, where a given feeder terminal relay has visibility of two or more feeder base stations, interference between the downlink channel soundings generated by those feeder base stations would distort the channel metrics derived at that feeder terminal relay. However, in accordance with the technique described in GB2,484,279A, a sounding schedule for the wireless feeder network is determined in dependence on a visibility matrix, the visibility matrix indicating which feeder base stations have visibility of which feeder terminals in the wireless feeder network. Thereafter, a sounding procedure within the wireless feeder network is carried out in accordance with the sounding schedule, such that the visibility between feeder base stations and feeder terminals is taken into account. In this way problems due to interference between sounding signals from different elements of the network can be avoided and hence the channel metrics derived from the sounding procedure more accurately represent the configuration and nature of the wireless feeder network.

Following step 555, the process proceeds to step 560, where the channel capacity per wireless communications link is computed for every firing graph. The calculation of channel capacities are carried out using well established techniques. For example, having regards to the channel matrix H, the channel capacities may be computed using the theoretical Shannon's channel capacity formula. Alternatively, taking the receiver structure into account, the channel capacities may be evaluated using a two-step process. In the first step, we compute the Signal to Interference and Noise Ratio (SINR) for every wireless communications link in a firing graph using H. The second step then uses a mapping function that maps the SINRs into a Modulation and Coding Scheme (MCS) dependent throughput. The MCS yielding the highest throughput (i.e. capacity) is selected. By way of example, returning to FIG. 8A, each communications link in a firing graph is labelled by the calculated channel capacity, these calculations being determined for an example deployment where the relay nodes are 7.5 km apart. For the first resource allocation 501, the channel capacity from node 0 to node 1 is 22.81 Megabits per second (Mbps). The channel capacity drops to 15.55 Mbps when node 0 transmits to node 2 using the second resource allocation 502.

Co-channel interference has a significant impact on link capacities. For example, in FIG. 8A, considering resource allocations 506 to 508, and concentrating on the communications links furthest from the base node 0, we observe that the link capacity increases as the distance from the interfering base node 0 increases. Despite the reduction in capacity when multiple interfering nodes are present, it would be appreciated that the total throughput in the wireless relay network may increase, since the same resource block(s) may be used by two or more transmitting nodes.

As with FIG. 8A, in FIG. 8B each communications link in a firing graph is also labelled by the calculated channel capacity, these calculations being determined for an example deployment where the relay nodes are 10 km apart.

Following step 560, step 565 of FIG. 9 is responsible for computing an optimised communications schedule identifying a connectivity pattern and associated weighted combination of resource allocations that maximises the network throughput. Step 570 then stores the optimised communications schedule computed at step 565 and the process then terminates at step 575.

Steps 560 and 565 will now be explained in more detail using FIG. 8A as an example. For each generated candidate connectivity pattern there is a plurality of associated valid resource allocations. For example, given the connectivity pattern of FIG. 8A, the number of valid resource allocations subject to the communications limitation conditions is M=12. The resource allocations and their associated channel capacities are also shown in FIG. 8A. Let $C_{n,m}$ denote the channel capacity (measured in Megabits per second) for recipient node n assuming the $m^{th}$ resource allocation is in use. The channel capacity matrix C is defined such that the $n^{th}$ row and $m^{th}$ column of C is given by $C_{n,m}$. The channel capacity matrix for FIG. 8A is hence:

$$C = \begin{bmatrix} 22.81 & 0 & 0 & 0 & 0 & 22.81 & 22.81 & 22.81 & 0 & 0 & 0 & 22.81 \\ 0 & 15.55 & 0 & 0 & 0 & 0 & 0 & 0 & 15.55 & 15.55 & 0 & 0 \\ 0 & 0 & 20.74 & 0 & 0 & 5.18 & 0 & 0 & 0 & 0 & 20.74 & 5.18 \\ 0 & 0 & 0 & 20.74 & 0 & 0 & 6.91 & 0 & 6.91 & 0 & 0 & 0 \\ 0 & 0 & 0 & 0 & 20.74 & 0 & 0 & 10.37 & 0 & 10.37 & 6.91 & 6.91 \end{bmatrix}$$

where each column of C corresponds to a resource allocation. The derivation of C corresponds to step 560 of FIG. 9.

For the connectivity pattern 500 shown in FIG. 8A, the relative load into recipient node n (assuming equal load for every node), denoted by $l_n$, is given by $l_1=1$ $l_2=4$ $l_3=3$ $l_4=2$ $l_5=1$ Let r denote the egress rate measured in Mbps. Based on the relative loads, the egress rate is the same for all nodes. For recipient node n the ingress rate is simply given by the product of the relative load $l_n$ and the egress rate r. The ingress rate per node cannot exceed the channel capacity. For example, if the first five resource allocations 501 to 505 of FIG. 8A are assigned to a communications schedule and each node is assigned one fifth of the air interface, then all the following inequalities must be satisfied:

$$\frac{C_{1,1}}{5} \geq l_1 r \Rightarrow 4.562 \geq r$$

$$\frac{C_{2,2}}{5} \geq l_2 r \Rightarrow 3.110 \geq 4r$$

$$\frac{C_{3,3}}{5} \geq l_3 r \Rightarrow 4.148 \geq 3r$$

$$\frac{C_{4,4}}{5} \geq l_4 r \Rightarrow 4.148 \geq 2r$$

$$\frac{C_{5,5}}{5} \geq l_5 r \Rightarrow 4.148 \geq r$$

It is clear from FIG. 8A that the communications link into node 2 is the most critical, carrying the highest ingress data rate (4r) using a relative low channel capacity (15.55/5 Mbps). Thus, under the assumptions of equal resource allocation, the maximum attainable egress rate is obtained by solving the inequality 3.110≥4r to yield r=0.775 Mbps.

In the example here, only the first five resource allocations were considered, with equal resource split. Ideally, in order to maximise the egress rate r, all possible combinations (5 out of 12) ought to be considered, with various levels of resource block assignments. This optimisation may at first appear as computationally cumbersome, but a simple solution does exists. In particular, in one embodiment, the optimal solution described below is used to perform step 565 of FIG. 9.

Let $t_m$ denote the fraction of resource blocks allocated to resource allocation m. Clearly, the sum of $t_m$ should equal to one. The ingress rate $l_n r$ into node n given the fractions $t_m$ for m=1, 2, . . . , M cannot exceed the channel capacity given by the following inequality $$\sum_{m=1}^{M} c_{n,m} t_m \geq l_n r$$

The optimal solution that maximises the egress rate can thus be formulated using the following linear programming problem $$\max r$$

$$\text{s.t.} \sum_{m=1}^{M} C_{n,m} t_m \geq l_n r, \forall n \in \{1, 2, \ldots, N\}$$

$$\sum_{m=1}^{M} t_m = 1$$

which alternatively can be rewritten in the following vector-matrix notation $$\min a^T x$$

$$\text{s.t.} \quad Ax \leq b$$

$$Fx = g$$

where $$x = \begin{bmatrix} r \\ t \end{bmatrix}$$

$$a = \begin{bmatrix} -1 \\ 0_{M \times 1} \end{bmatrix}$$

$$A = [l \quad -C]$$

$$F = [0 \quad 1_{1 \times M}]$$

$$b = 0_{N \times 1}$$

$$g = 1$$

$0_{M \times 1}$ denotes a row vector of zeros with M elements, and $1_{1 \times M}$ is a row vector of ones. The optimal r and the associated fractions $t_m$, denoting the weighted combination of resource allocations, can be solved using for example the "simplex algorithm". For our example in FIG. 8A, the above approach yields an optimal egress rate is 2.26 Mbps, representing a significant improvement over the 0.775 Mbps identified earlier assuming an equal resource allocation. The optimal weighted combination of resource allocations determined by the above approach is given by the fractions: $t_9$=58.09%, $t_{11}$=30.05%, $t_7$=7.27%, $t_{12}$=2.63% and $t_3$=1.96% indicating that the majority of resource blocks are reused for improved performance, despite the significant drop in throughput in a link subject to multiple access interference (note 6.91 Mbps for node 5 in allocation #12 512 compared to 20.74 Mbps in allocation #5 505).

Figure 10:
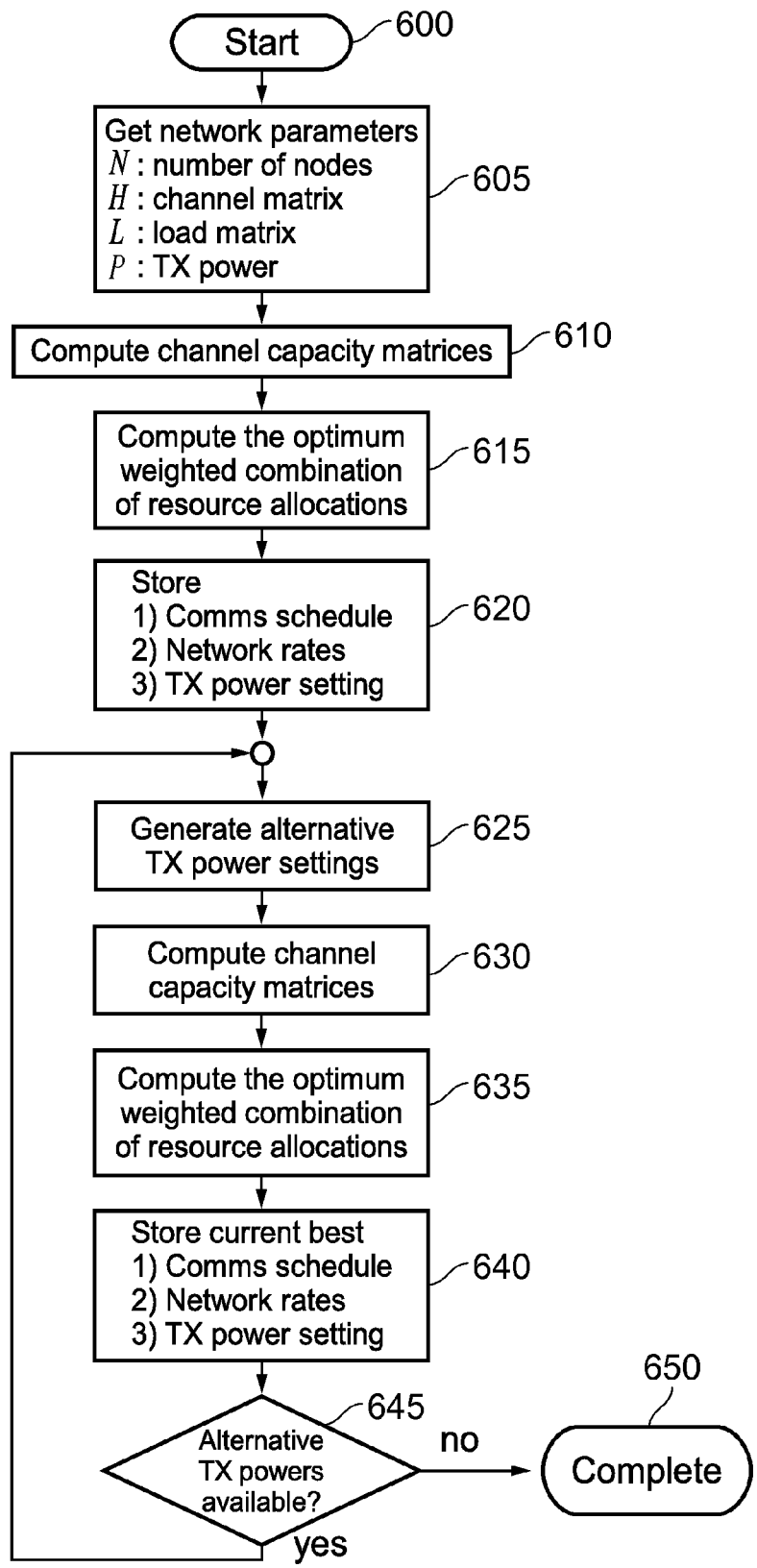
FIG. 10 is a flow diagram illustrating the general sequence of steps performed to implement step 490 of FIG. 4 in accordance with an alternative embodiment.

FIG. 10 is a flow diagram illustrating the general sequence of steps performed to implement step 490 of FIG. 4 in accordance with an alternative embodiment, where the weighted combination of resource allocations is calculated for a variety of different transmit powers, with the optimum one then being selected. Steps 600 to 620 correspond to steps 550 to 570, respectively, of FIG. 9, except that at step 605 a transmit power setting is also specified. At step 610 the channel capacity matrix is computed having regard to that transmit power setting, whereafter at step 615 the optimum weighted combination of resource allocations is determined in the manner discussed earlier in relation to step 565 of FIG. 9. At step 620 the transmit power setting is stored in addition to the selected communications schedule and associated network rates.

Thereafter, at step 625, an alternative transmit power setting is chosen, whereafter steps 630 and 635 repeat the process of steps 610 and 615 (this time the channel capacity matrix taking into account the altered transmit power setting). Then at step 640, if the newly selected communications schedule determined at step 635 is better, having regard to the chosen performance characteristic (e.g. egress rate for the downlink communication path example considered with reference to FIGS. 8A and 8B), that communications schedule is stored at step 640, along with its associated network rates and transmit power. Otherwise, the previously stored communications schedule and associated network rates and transmit power setting are retained at step 640.

At step 645, it is determined if there are any further variations of transmit power setting to consider, and if so steps 625 to 640 are repeated. Once it is determined that there are no further variations of transmit power setting to consider, the process ends at step 650.

Whilst in FIG. 10 the variation of transmit power and associated computation of channel capacity matrix and optimum weighted combination of resource allocations is shown as a serial process, in an alternative embodiment this process can be performed in one pass. In particular, all different power settings to be considered can be identified at step 605, and then an enlarged channel capacity matrix can be determined at step 610, based on an enlarged number of candidate resource allocations that take into account the various power setting options. Step 615 then merely needs to be performed once in order to determine the optimum communications schedule and associated network rates and power settings.

It has been found that reducing the transmit power can have a beneficial effect on the chosen performance characteristic, particularly where there are resource allocations providing multiple communications links, and hence where there is a degree of interference. For example, considering resource allocation 512 of FIG. 8A, reducing the transmit power will reduce the transmit rate from node 0 to node 1, but may well improve the transmit rate from node 2 to node 3, and from node 4 to node 5.

Figure 11A:
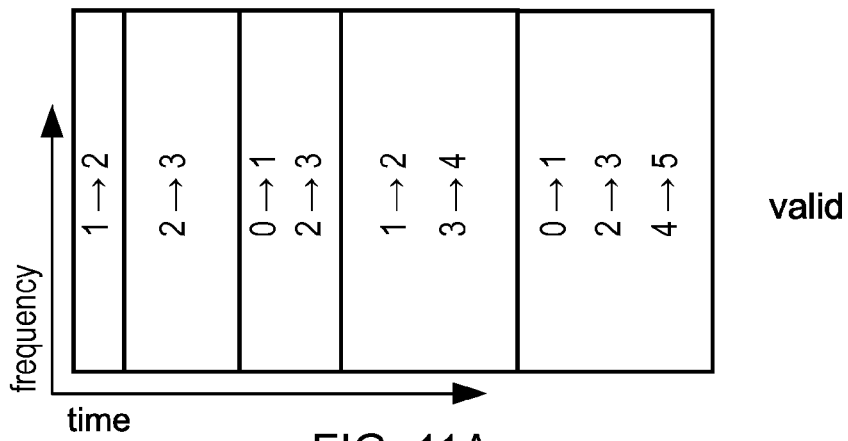
FIGS. 11A to 11C illustrate candidate resource block allocations that could be used to implement the communications schedule of FIG. 8B in accordance with one embodiment.
Figure 11B:
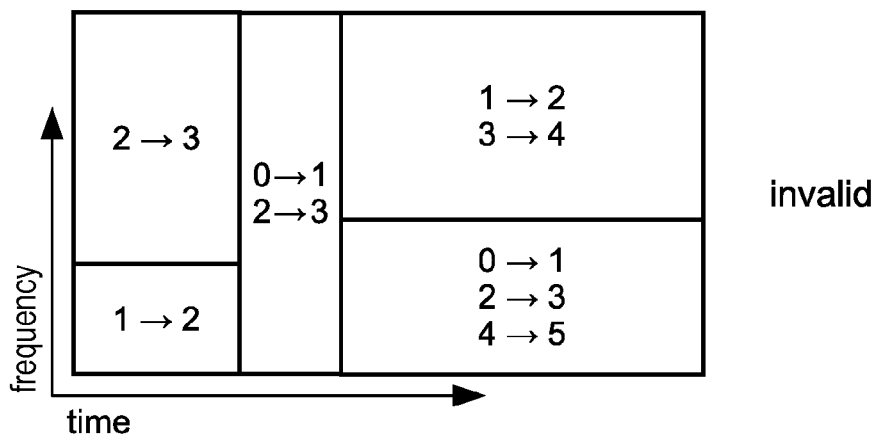
Figure 11C:
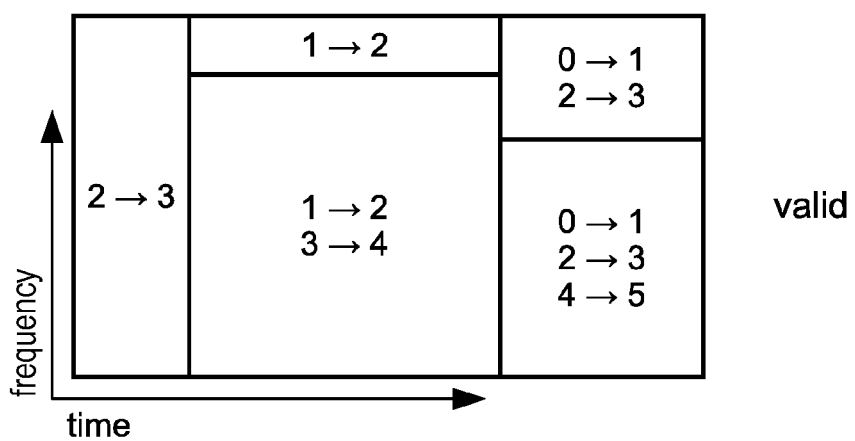

Once the process of FIG. 4 has been completed, and one of the communications schedules has been selected by the communications schedule selector 425 of FIG. 3, a resource block allocation operation will typically be performed, in order to select a valid allocation of resource blocks in order to provide the ordered sequence of communications links using the resource allocations of the selected communications schedule. FIG. 11A to 11C illustrate candidate resource block allocations that could be used to implement the communications schedule of FIG. 8B in accordance with one embodiment. As shown in FIG. 8B, the optimal weighted combination of resource allocations is given by the fractions $t_9=35.94\%$, $t_{12}=26.96\%$, $t_3=16.02\%$, $t_6=13.88\%$ and $t_2=7.20\%$ FIGS. 11A and 11C show valid options for allocating the resource blocks in the time and frequency domains to provide the required wireless communications links using those resource allocations. However, FIG. 11B is not a valid option, as it would require nodes 1, 2, 3 and 4 to both transmit data and receive data simultaneously, contrary to one of the communications limitation conditions.

Figure 12:
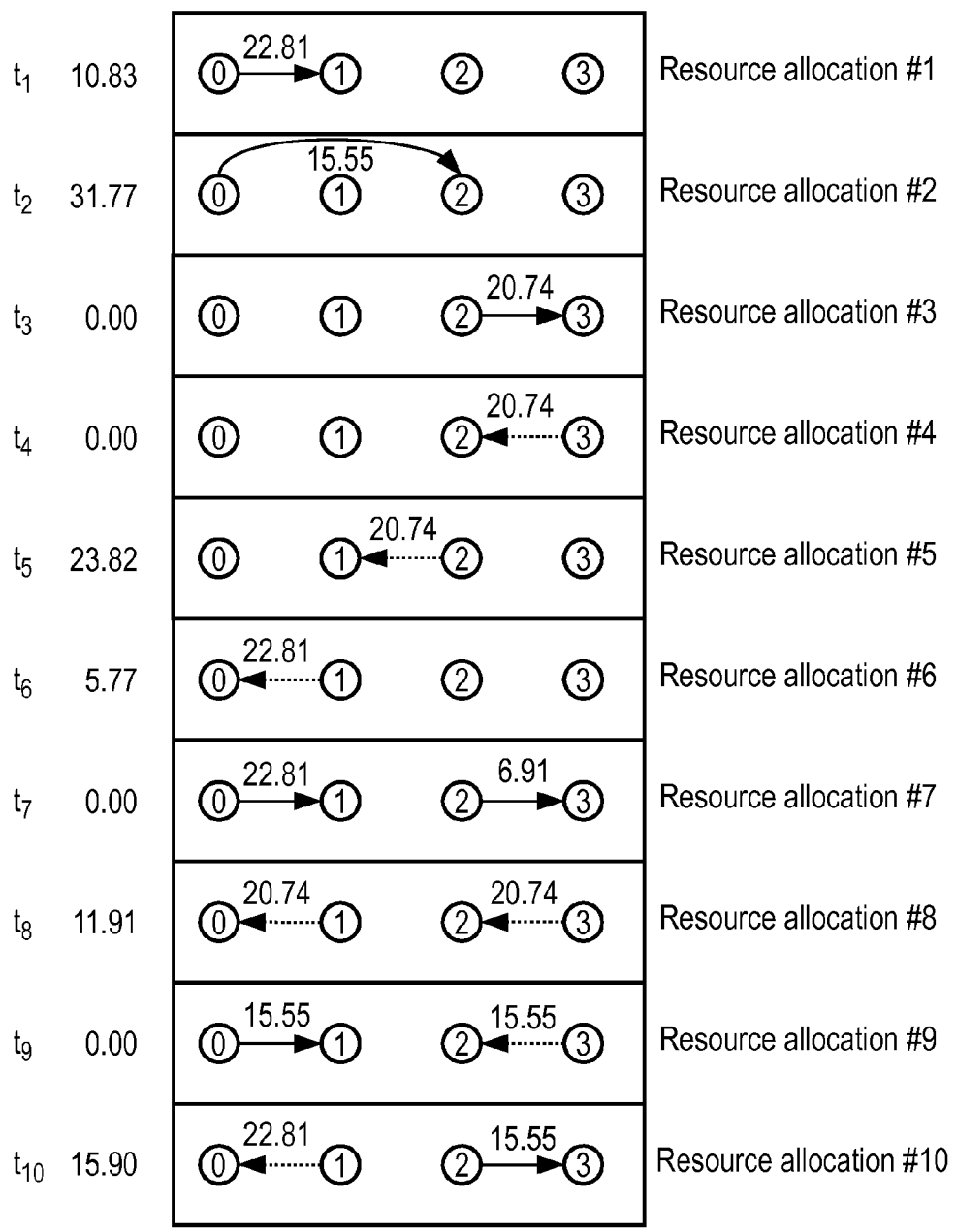
FIG. 12 illustrates an example of a candidate connectivity pattern and associated combination of candidate resource allocations that may be generated in one embodiment to form a communications schedule supporting both downlink and uplink communications.

Whilst in the above-described embodiment, a downlink communication path was considered for the sake of illustration, the above-described techniques are equally applicable to the computation of a communications schedule for providing an ordered sequence of communications links to form an uplink communication path (where the desired performance characteristic will typically be specified in terms of an ingress rate), or indeed may be used to generate a communications schedule that provides communications links for both uplink and downlink communications (where the desired performance characteristic may be specified in terms of both an egress rate for the downlink communication and an ingress rate for the uplink communication). Such a combined communication schedule is shown in FIG. 12. Downlink communication links are shown with a solid line and uplink communication links are shown with a dotted line. As shown, resource allocations 9 and 10 provide both downlink communication and uplink communication links are provided. Also, in this example, the downlink connectivity pattern is different to the uplink connectivity pattern, but this is not necessary and in some instances the selected communications schedule may use the same connectivity pattern for the downlink communication path and the uplink communication path.

Figure 13A:
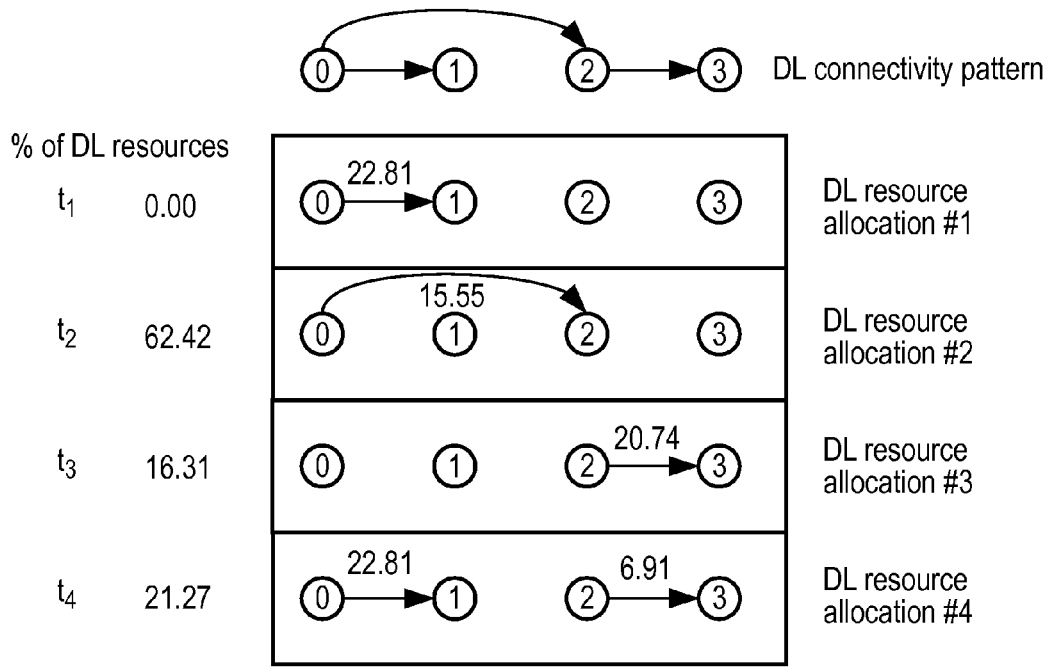
FIGS. 13A and 13B illustrate examples of candidate connectivity patterns and associated combinations of candidate resource allocations that may be generated in one embodiment to form separate communications schedules supporting downlink and uplink communications, respectively.
Figure 13B:
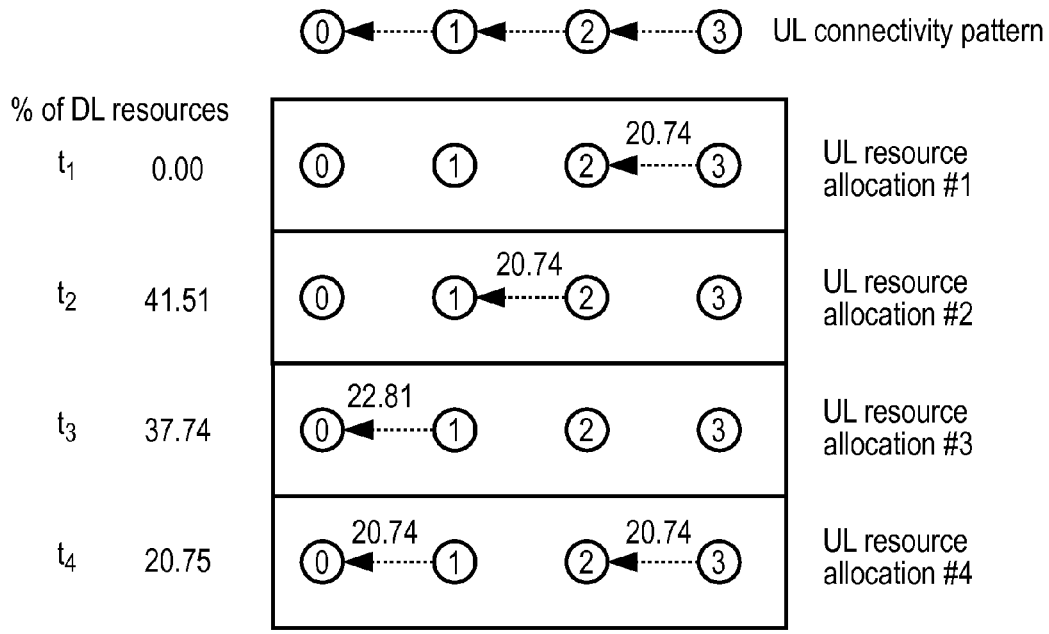

As mentioned above, in an alternative embodiment the computation of a downlink communication path and an uplink communication path may be done separately, as shown by way of example in FIGS. 13A and 13B, respectively. In one embodiment, uplink and downlink communication may be separated in time using the Time Division Duplexing (TDD) method. Assuming an equal uplink and downlink time split, the disjoint optimisation examples of FIGS. 13A and 13B will yield an egress rate of 2.43 Mbps and an ingress rate of 2.15 Mbps as shown in the resource block assignments of FIG. 14A. Clearly, allocating more resource blocks for uplink communication will increase the ingress rate, but such a strategy will come at the expense of decreasing the egress rate. A fine balance can be obtained, where the ingress rate and the egress rate are made equal by appropriately choosing the uplink and downlink TDD switching point, as shown in FIG. 14B. The two rates become equal if the allocated uplink and downlink periods are made proportional to the downlink (2.43) and uplink rates (2.15), respectively, normalised by the sum of the two rates (=4.58). As shown in FIG. 14B, the ingress and egress rate both become 2.28 Mbps, representing a modest improvement. Recall however that the joint optimisation of the uplink and downlink communication paths of FIG. 12 yields an ingress and egress rate of 2.47 Mbps, representing a 15% improvement compared to the equal time TDD case. FIG. 14C shows an example resource block allocation that may be used to implement the joint communications schedule of FIG. 12.

Figure 15:
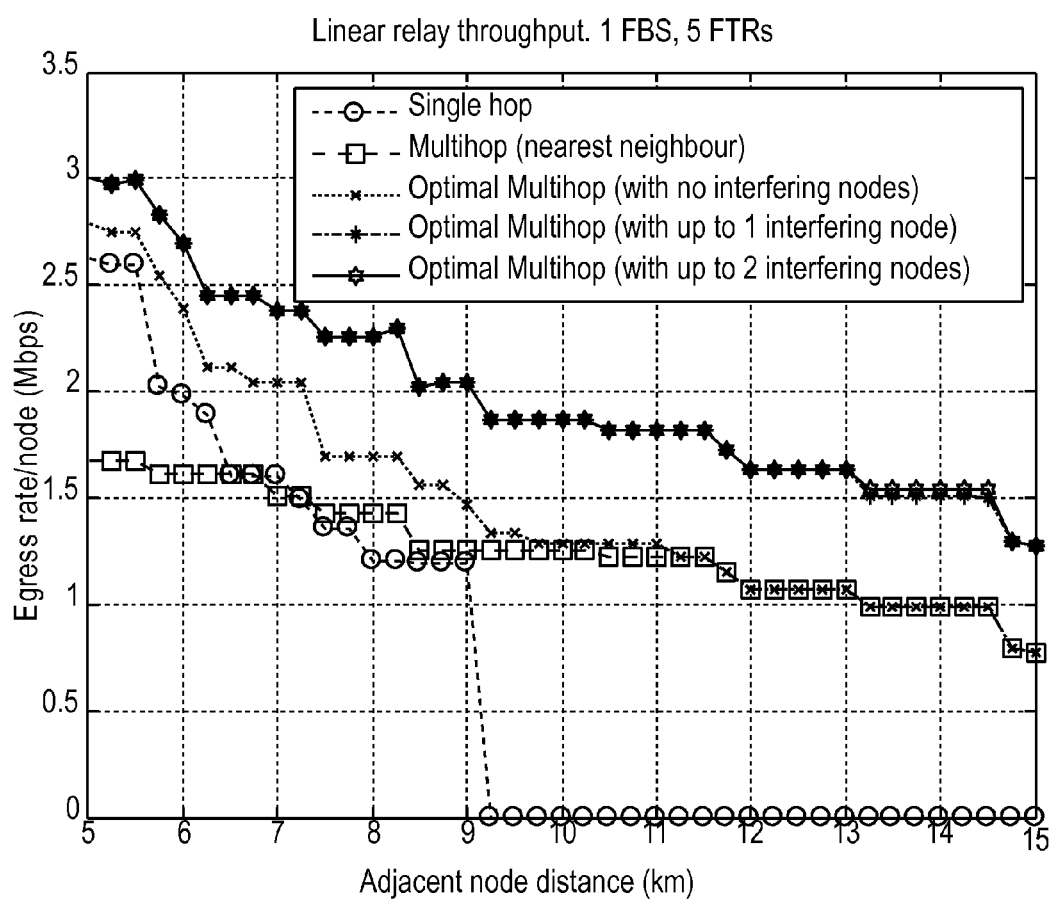
FIG. 15 illustrates typical network performance gains achievable when using the techniques of the described embodiments relative to known prior art techniques.

FIG. 15 illustrates typical network performance gains achievable when using the techniques of the described embodiments relative to known prior art techniques. As shown, whilst known single hop arrangements can give good egress rates when adjacent nodes are relatively close, and known multihop arrangements can give good egress rates when adjacent nodes are relatively far apart, the arrangements resulting from application of the techniques of the above-described embodiments tend to outperform the known techniques across the whole range of separation distances of adjacent nodes. In this example, the network performance for the optimal multihop with one interfering node is almost identical to the network performance for the optimal multihop with two interfering nodes, just deviating slightly in the 13 to 14.5 km range.

Figure 16:
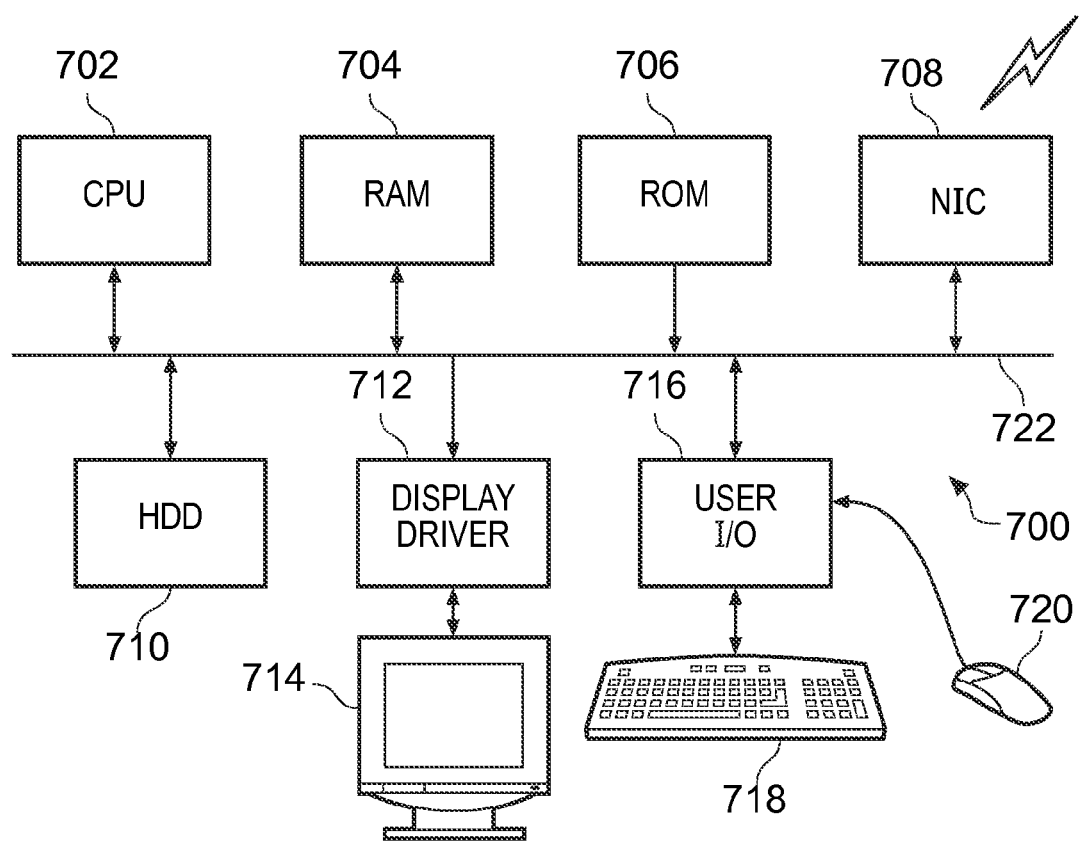
FIG. 16 is a diagram of a computer system on which one or more suitable computer programs can be executed to perform a method of determining a communication schedule in accordance with the described embodiments.

FIG. 16 schematically illustrates a general purpose computer 700 of the type that may be used to implement the above described operations for determining a communications schedule for relay nodes of a wireless relay network. The general purpose computer 700 includes a central processing unit 702, a random access memory 704, a read only memory 706, a network interface card 708, a hard disk drive 710, a display driver 712 and monitor 714 and a user input/output circuit 716 with a keyboard 718 and mouse 720 all connected via a common bus 722. In operation, the central processing unit 702 will execute computer program instructions that may be stored in one or more of the random access memory 704, the read only memory 706 and the hard disk 710 or dynamically downloaded via the network interface card 708. The results of the processing performed may be displayed to a user via the display driver 712 and the monitor 714. User inputs for controlling the operation of the general purpose computer 700 may be received via the user input/output circuit 716 from the keyboard 718 or the mouse 720. It will be appreciated that the computer program could be written in a variety of different computer languages. The computer program may be stored and distributed on a recording medium or dynamically downloaded to the general purpose computer 700. When operating under control of an appropriate computer program, the general purpose computer 700 can perform the above described operations for determining a communications schedule for relay nodes of a wireless relay network, and hence can be considered to form an apparatus for performing the above described operations. The architecture of the general purpose computer 700 could vary considerably and FIG. 16 is only one example.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A method of determining a communications schedule for routing data between a plurality of relay nodes forming a wireless relay network, the communications schedule being arranged to interconnect the plurality of relay nodes by an ordered sequence of communications links, the communications links being established over a wireless resource comprising a plurality of resource blocks, the method comprising steps:
    (a) generating a plurality of candidate connectivity patterns for said ordered sequence of communications links;
    (b) for each candidate connectivity pattern, generating a plurality of candidate resource allocations for providing said ordered sequence of communications links in accordance with that candidate connectivity pattern, each of the candidate resource allocations in said plurality of candidate resource allocations providing a candidate option for providing one or more of the communications links of said ordered sequence using at least one resource block of said wireless resource;
    (c) for each candidate connectivity pattern, calculating a level of a performance characteristic for a selected combination of the candidate resource allocations associated with that candidate connectivity pattern, said selected combination of the candidate resource allocations specifying a relative usage of each candidate resource allocation in the selected combination with respect to other candidate resource allocations in the selected combination in order to provide said ordered sequence of communications links;
    (d) based on a desired level of said performance characteristic, selecting as said communications schedule one of said candidate connectivity patterns and its associated selected combination of the candidate resource allocations whose calculated level of said performance characteristic meets said desired level; and
    (e) in response to a trigger condition, repeating said steps (c) and (d) in order to re-select one of said candidate connectivity patterns and its associated selected combination of the candidate resource allocations to be used as the communications schedule wherein:
        said plurality of relay nodes forming the wireless relay network comprises N relay nodes; and
        at said step (a) an algorithm is executed to produce as each candidate connectivity pattern a spanning tree pattern, whereby a number of candidate connectivity patterns is $N^{N-2}$.

2. A method as claimed in claim 1, wherein said calculating step comprises performance of a linear programming function to determine the selected combination of the candidate resource allocations.

3. A method as claimed in claim 1, wherein said selected combination of the candidate resource allocations is a weighted combination of each candidate resource allocation in said plurality of candidate resource allocations generated at said step (b), with the relative usage of each candidate resource allocation having a value between zero and a maximum value.

4. A method as claimed in claim 1, wherein said selected combination of the candidate resource allocations is that combination from amongst all possible combinations that yields a highest level of said performance characteristic.

5. A method as claimed in claim 1, wherein said trigger condition comprises at least one of a change in load of the data to be routed using the communications schedule or a change in conditions affecting the communications links of the communications schedule.

6. A method as claimed in claim 1, further comprising:
    in response to a reconfiguration condition, repeating said steps (a) and (b).

7. A method as claimed in claim 6, wherein said reconfiguration condition comprises a change in the N relay nodes in said plurality of relay nodes.

8. A method as claimed in claim 1, further comprising the step of performing a resource block allocation operation to allocate a number of the resource blocks from said plurality of resource blocks to provide the ordered sequence of communication links in accordance with the selected combination of the candidate resource allocations of the communication schedule selected at said step (d).

9. A method as claimed in claim 8, wherein different resource blocks from said plurality of resource blocks are allocated for each candidate resource allocation in the selected combination.

10. A method as claimed in claim 1, wherein said wireless relay network is provided within a wireless data network, data external to the wireless relay network forming exogenous data of the wireless relay network, and said desired level of said performance characteristic identifying a desired bandwidth of said exogenous data available within at least a part of the wireless data network coupled to the wireless relay network.

11. A method as claimed in claim 1, wherein said wireless relay network is provided within a wireless data network, and said plurality of relay nodes form a downlink communication path within said wireless data network.

12. A method as claimed in claim 11, wherein said wireless relay network is provided within a wireless data network, data external to the wireless relay network forming exogenous data of the wireless relay network, and said desired level of said performance characteristic identifying a desired bandwidth of said exogenous data available within at least a part of the wireless data network coupled to the wireless relay network, wherein said desired bandwidth of said exogenous data comprises a desired egress rate for exogenous data emitted from the wireless relay network by one or more chosen relay nodes.

13. A method as claimed in claim 1, wherein said wireless relay network is provided within a wireless data network, and said plurality of relay nodes form an uplink communication path within said wireless data network.

14. A method as claimed in claim 13, wherein said wireless relay network is provided within a wireless data network, data external to the wireless relay network forming exogenous data of the wireless relay network, and said desired level of said performance characteristic identifying a desired bandwidth of said exogenous data available within at least a part of the wireless data network coupled to the wireless relay network, wherein said desired bandwidth of said exogenous data comprises a desired ingress rate for exogenous data input from the wireless data network to one or more chosen relay nodes of the wireless relay network.

15. A method as claimed in claim 1, wherein said wireless relay network is provided within a wireless data network, and said plurality of relay nodes form both a downlink communication path and an uplink communication path within said wireless data network.

16. A method as claimed in claim 15, wherein said wireless relay network is provided within a wireless data network, data external to the wireless relay network forming exogenous data of the wireless relay network, and said desired level of said performance characteristic identifying a desired bandwidth of said exogenous data available within at least a part of the wireless data network coupled to the wireless relay network, wherein said desired bandwidth of said exogenous data comprises at least one of a desired egress rate for exogenous data emitted from the wireless relay network by one or more chosen relay nodes, and a desired ingress rate for exogenous data input from the wireless data network to one or more chosen relay nodes of the wireless relay network.

17. A method as claimed in claim 1, wherein:
at said step (a) the algorithm is a Prüfer decoding algorithm executed to produce as each candidate connectivity pattern the spanning tree pattern derived from a Prüfer sequence, whereby a number of candidate connectivity patterns is $N^{N-2}$.

18. A method as claimed in claim 1, wherein at said step (b) said plurality of candidate resource allocations are determined having regard to at least one communications limitation condition.

19. A method as claimed in claim 18, wherein said at least one communications limitation condition comprises a limitation that each relay node cannot simultaneously transmit data and receive data.

20. A method as claimed in claim 18, wherein said at least one communications limitation condition comprises a limitation that each relay node cannot simultaneously transmit data to more than one relay node using the same candidate resource allocation.

21. A method as claimed in claim 18, wherein at said step (b) said plurality of candidate resource allocations comprises at least one candidate resource allocation that provides multiple of the communications links simultaneously in a manner that does not contravene said at least one communications limitation condition.

22. A method as claimed in claim 1, wherein the plurality of relay nodes use directional antennae to transmit data.

23. A method as claimed in claim 22, wherein at said step (b) said plurality of candidate resource allocations comprises at least one candidate resource allocation that provides multiple of the communications links simultaneously in a manner that does not contravene said at least one communications limitation condition, wherein the directional antennae are configured to reduce interference when said multiple of the communications links are provided simultaneously by one of said candidate resource allocations.

24. A method as claimed in claim 1, wherein said step (c) comprises, for each candidate connectivity pattern, steps of:
(i) computing a channel capacity matrix identifying, for each candidate resource allocation, an endogenous data capacity for each wireless communications link to be provided by that candidate resource allocation; and
(ii) performing a linear programming function to determine, as said selected combination, a weighted combination of the candidate resource allocations that identifies, for each candidate resource allocation, a relative usage amount of that candidate resource allocation required, having regard to an expected data loading, in order to support the endogenous data capacity of each wireless communications link of that candidate resource allocation.

25. A method as claimed in claim 24, wherein:
each relay node has a transmit antenna assembly whose transmit power is configurable; and
during said step (i) the channel capacity matrix is computed taking into account a plurality of transmit power settings.

26. A method as claimed in claim 24, further comprising a step of generating a load matrix for each candidate connectivity pattern to provide the expected data loading used in said step (ii).

27. A method as claimed in claim 1, wherein the relay nodes of said wireless relay network are provided within a wireless feeder network used to couple access base stations of an access network with a communications network, the wireless feeder network comprising a plurality of feeder base stations coupled to the communications network and a plurality of feeder terminal relays coupled to associated access base stations, the relay nodes of said wireless relay network comprising at least one of said feeder base stations and multiple of said feeder terminal relays.

28. A system for determining a communications schedule for routing data between a plurality of relay nodes forming a wireless relay network, the communications schedule being arranged to interconnect the plurality of relay nodes by an ordered sequence of communications links, the communications links being established over a wireless resource comprising a plurality of resource blocks, the system comprising:
connectivity pattern generation circuitry configured to generate a plurality of candidate connectivity patterns for said ordered sequence of communications links;
resource allocation generation circuitry configured, for each candidate connectivity pattern, to generate a plurality of candidate resource allocations for providing said ordered sequence of communications links in accordance with that candidate connectivity pattern, each of the candidate resource allocations in said plurality of candidate resource allocations providing a candidate option for providing one or more of the communications links of said ordered sequence using at least one resource block of said wireless resource;

performance level calculation circuitry configured, for each candidate connectivity pattern, to calculate a level of a performance characteristic for a selected combination of the candidate resource allocations associated with that candidate connectivity pattern, said selected combination of the candidate resource allocations specifying a relative usage of each candidate resource allocation in the selected combination with respect to other candidate resource allocations in the selected combination in order to provide said ordered sequence of communications links;

selection circuitry configured, based on a desired level of said performance characteristic, to select as said communications schedule one of said candidate connectivity patterns and its associated selected combination of the candidate resource allocations whose calculated level of said performance characteristic meets said desired level; and said performance level calculation circuitry and said selection circuitry being responsive to a trigger condition to repeat their performance level calculation and selection operations in order to re-select one of said candidate connectivity patterns and its associated selected combination of candidate resource allocations to be used as the communications schedule, wherein:

said plurality of relay nodes forming the wireless relay network comprises N relay nodes; and said connectivity pattern generation circuitry is configured to produce as each candidate connectivity pattern a spanning tree pattern, whereby a number of candidate connectivity patterns is $N^{N-2}$.

29. A nontransitory storage medium storing a computer program which, when executed on a computer, performs the method, as claimed in claim 1, of determining the communications schedule for routing the data between the plurality of relay nodes forming the wireless relay network.

30. A wireless feeder network, in accordance with the method of claim 1, the wireless feeder network used to couple access base stations of an access network with a communications network, the wireless feeder network comprising a plurality of feeder base stations coupled to the communications network and a plurality of feeder terminal relays coupled to associated access base stations, the wireless feeder network including the wireless relay network comprising the plurality of relay nodes, the relay nodes of said wireless relay network comprising at least one of said feeder base stations and multiple of said feeder terminal relays, the wireless feeder network further comprising a controller for determining the communications schedule for routing the data between said plurality of relay nodes.

31. A system as claimed in claim 28, wherein:

said connectivity pattern generation circuitry is configured to execute a Prüfer decoding to produce as each candidate connectivity pattern the spanning tree pattern derived from a Prüfer sequence, whereby the number of candidate connectivity patterns is $N^{N-2}$.

\* \* \* \* \*